United States Patent
Li et al.

(10) Patent No.: US 10,979,294 B2
(45) Date of Patent: Apr. 13, 2021

(54) SERVICE NETWORK MAINTENANCE ANALYSIS AND CONTROL

(71) Applicant: Accenture Global Solutions Limited, Dublin (IE)

(72) Inventors: Ming Li, Beijing (CN); Jianhua Zhang, Beijing (CN); Zitong Song, Beijing (CN); Qin Zhou, Beijing (CN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 231 days.

(21) Appl. No.: 16/326,849

(22) PCT Filed: Aug. 22, 2016

(86) PCT No.: PCT/CN2016/096251
§ 371 (c)(1),
(2) Date: Feb. 20, 2019

(87) PCT Pub. No.: WO2018/035682
PCT Pub. Date: Mar. 1, 2018

(65) Prior Publication Data
US 2019/0215240 A1    Jul. 11, 2019

(51) Int. Cl.
*G06F 15/173* (2006.01)
*H04L 12/24* (2006.01)
(Continued)

(52) U.S. Cl.
CPC ..... *H04L 41/0826* (2013.01); *G06Q 10/0631* (2013.01); *G06Q 10/20* (2013.01);
(Continued)

(58) Field of Classification Search
CPC ............. H04L 41/0826; H04L 41/082; H04L 41/0893; H04L 41/12; H04L 41/147; H04L 41/5019; G06Q 10/0631; G06Q 10/20
See application file for complete search history.

(56) References Cited

U.S. PATENT DOCUMENTS 7,444,200 B1 * 10/2008 Qu ................. G06Q 10/06
                                                        700/121
7,508,920 B1    3/2009 Yu et al.
(Continued)

FOREIGN PATENT DOCUMENTS

CN    101764406 A    6/2010
CN    102243734 A    11/2011

OTHER PUBLICATIONS

International Search Report and Written Opinion of the International Search Authority dated Mar. 21, 2018 in International Application No. PCT/CN2016/096251 (English language) (8 pp.).

*Primary Examiner* — Philip B Tran
(74) *Attorney, Agent, or Firm* — Brinks Gilson & Lione

(57) ABSTRACT

Modern day-to-day life depends on reliable operation of network devices in a wide range of service network such as an electric grid. An analysis and control system executes a complex technical analysis to determine maintenance optimizations for the service network. The system arrives at the optimizations after taking into consideration the maintenance tasks to be performed across a time-dependent network topology and service sensitivity of the network devices to service outage.

20 Claims, 11 Drawing Sheets

(51) Int. Cl.
*G06Q 10/00* (2012.01)
*G06Q 10/06* (2012.01)
*G06Q 50/06* (2012.01)
*H02J 3/38* (2006.01)

(52) U.S. Cl.
CPC ........... G06Q 50/06 (2013.01); H02J 3/38 (2013.01); H04L 41/082 (2013.01); H04L 41/0893 (2013.01); H04L 41/12 (2013.01); H04L 41/147 (2013.01); H04L 41/5019 (2013.01); *H02J 2203/20* (2020.01)

(56) References Cited

U.S. PATENT DOCUMENTS

| | | | |
|---|---|---|---|
| 7,716,077 B1* | 5/2010 | Mikurak | G06Q 10/06 705/7.12 |
| 8,401,726 B2* | 3/2013 | Bouvier | G07C 5/006 701/29.1 |
| 2002/0049563 A1 | 4/2002 | Vetter et al. | |
| 2007/0011035 A1* | 1/2007 | Yaffe | G06Q 10/08 705/7.24 |
| 2010/0070237 A1* | 3/2010 | Yitbarek | G06Q 50/30 702/177 |
| 2012/0059684 A1 | 3/2012 | Hampapur et al. | |
| 2014/0122143 A1* | 5/2014 | Fletcher | G06Q 10/0631 705/7.14 |
| 2014/0164622 A1 | 6/2014 | Afshin | |
| 2017/0149624 A1* | 5/2017 | Chitti | G06F 11/1464 |
| 2018/0005197 A1* | 1/2018 | Kesler | G07C 5/0808 |

\* cited by examiner

SERVICE NETWORK MAINTENANCE ANALYSIS AND CONTROL

CROSS-REFERENCE TO RELATED APPLICATION

This application is the U.S. National Stage of International Application No. PCT/CN2016/096251, filed on Aug. 22, 2016.

TECHNICAL FIELD

This application concerns executing and optimizing maintenance operations in service networks.

BACKGROUND

Modern day-to-day life relies on a wide range of service networks such as an electric grid. At the same time, the reliable operation of various network equipment, service nodes, and other aspects of a service network requires constant maintenance and associated periods of down time. Improvements in the complex analysis and execution of maintenance operations will further enhance and optimize the operation of the service network.

DETAILED DESCRIPTION

Preventive maintenance of network devices is a key to long-term reliability in operating a complex service network such as an electric grid. A network device in an electric grid may be, for example, a distribution transformer that provides service to one or more service targets. Regular maintenance helps avoid unexpected equipment failure and improves quality of service. Maintenance of network devices, however, usually requires electrical and/or mechanical isolation of the network device being maintained. The network topology of the service network may be reconfigurable such that service to a service target whose service was previously provided through a network device being maintained may be rerouted to the service target via another operating network device. Nevertheless, maintenance of the network device may inevitably cause service outages to some service targets of the service network.

A given set of N maintenance tasks for the network devices of a service network over a period of time may be scheduled under a set of scheduling constraints in many possible ways. For any one possible maintenance schedule that conforms to the set of scheduling constraints, the network topology of the service network may be configured over time to minimize overall impact of service outages caused by the maintenance. The impact of outages caused by the maintenance may be measured by lost values at the service targets. Different service targets may have varying sensitivities to service outages. These sensitivities may not necessarily be reflected in the unit price for the services provided by the service network. For example, even though there may be no differentiation of electricity price among service targets (e.g., price per kilowatt), the sensitivities to service outages for service targets may vary. These sensitivities may be estimated and quantified using historical values of a variety of service parameters including but not limited to historical service loads and historical complaints of service interruption, as well as forecasted service load and predefined requests for uninterrupted service for each service target.

The exemplary implementations below disclose methods and systems for iterative optimization of maintenance schedules and time-dependent topologies of a service network for minimizing the overall impact due to service outages, taking into consideration various scheduling and topology constraints, as well as service targets' sensitivities to service outages. The optimization algorithms may be based on integer and/or mixed integer optimization techniques. In one further implementation, workload-balanced assignment of the maintenance tasks arranged in an optimized maintenance schedule under a set of assignment constraints to a set of N maintenance teams may be achieved using a matrix-based optimization algorithm.

Figure 1:
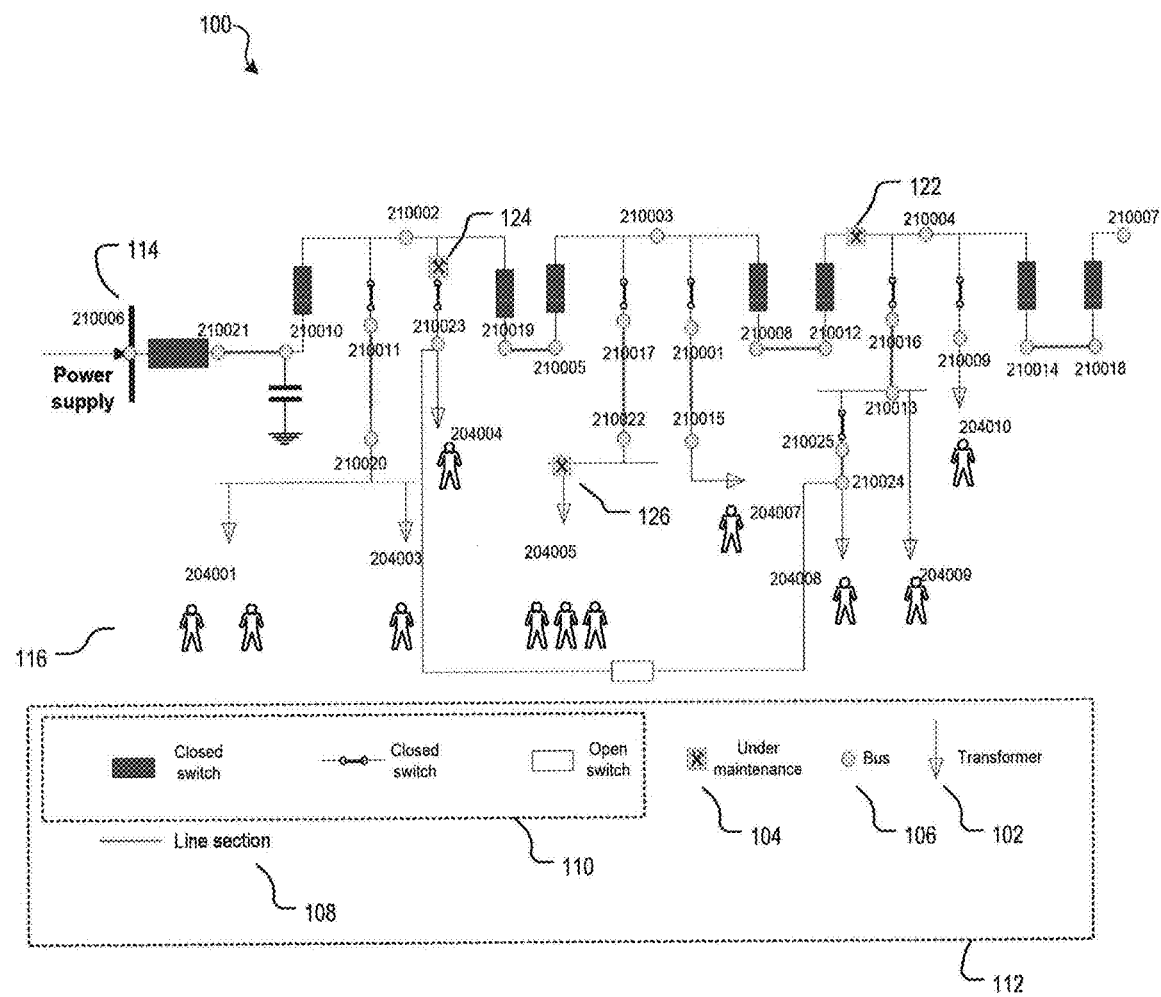
FIG. 1 shows an example of a service network.

FIG. 1 shows, as an example, a service network 100 in the form of an electric grid or a portion of an electric grid. The electric grid is used for the purposes of explanation, and the systems and techniques described below are not limited to electric grids. The electric grid 100 includes various network devices shown by the legends 112. While specific types of network devices are referred to below for the discussion, network devices may vary widely. Examples of network devices include distribution transformers, distribution generators, switches, buses, voltage regulators, overhead lines, and underground cables.

For the example below, network devices include distribution transformers (alternatively referred to as service nodes) 102, switches 110, buses 106, and line sections 108. The distribution transformers 102 are electrically connected to and are gateways to provide service to service targets 116. Some distribution transformers, such as 204003, 204005, 24007-204010, may supply electricity to a single service target. But in generally, distribution transformers, such as 204001 and 204005, may be connected to multiple service targets. Each service target is preferably serviced by one distribution transformer. Each distribution transformer may be supplied via one of multiple possible paths in the grid. As such, a service target may likewise be served via one of the multiple possible paths for the distribution transformer connected to it The switches 110 are preferably configurable, either manually or via computerized control interfaces. The switches 110 may be used to isolate a network device electrically from the rest of the electric grid 100 when that network device needs maintenance. The switches 110 may additionally be used to reconfigure the network topology of the electric grid 100. The term network topology is used to refer to the state of network connectivity between network devices and network paths of the service network (here, an electric grid). The network topology thus may be reconfigured in real-time (via computerized control interfaces) to adapt to maintenance of the network devices. For example, if a network device along a current service path to a service target is scheduled for maintenance, the network topology may be reconfigured to allow the service target to be serviced via another alternative path not including that network device. Network devices other than the distribution transformers, such as buses 106, switches 110, and line sections 108, may not be directly connected to any service target but their maintenance may nevertheless cause service outages to some service targets under certain network topologies.

The electric grid 100 may further include special purpose network nodes, such as the injection node 114. The injection node 114 represents a location where a source is connected to the service network. In the context of electric grid 100, the injection node 114 provides an input node for electricity delivered into the electric grid 100 for consumption by other entities. The electric grid 100 or other service network for distributing services from well-defined sources may have more than one injection node 114. Having multiple injection nodes may be preferable because maintenance of some network devices may cut off one injection node completely and the service network may still be reconfigured to use other injection nodes as sources. For the electric grid 100 of FIG. 1, it may be further preferable that it is always configured in such a way that each distribution transformer is only energized by one injection node.

Figure 2:
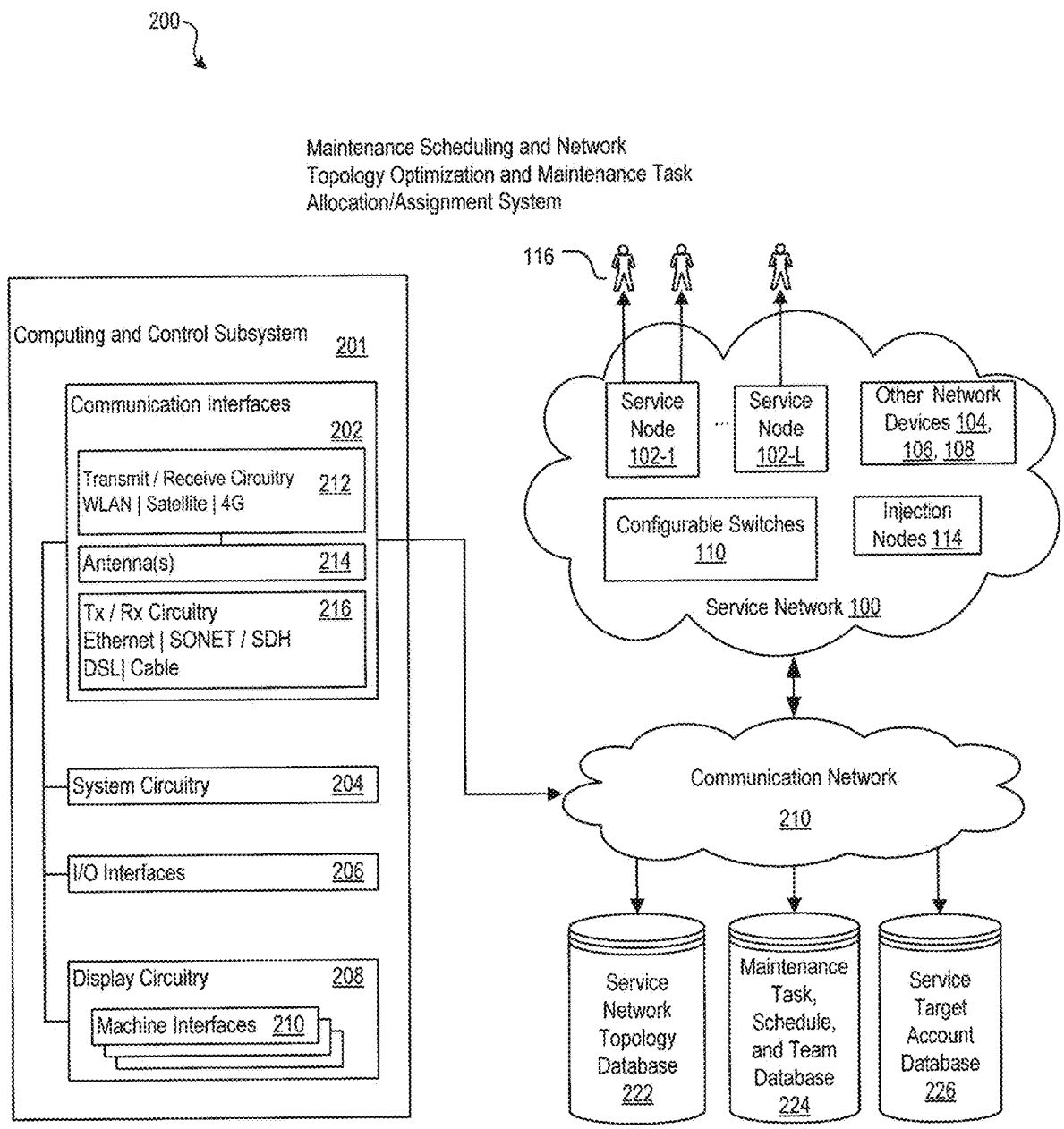
FIG. 2 shows a maintenance scheduling and network topology optimization system implemented for a service network.

FIG. 2 shows an example implementation 200 of a network device maintenance scheduling and network topology optimization, and maintenance task allocation/assignment system. The system 200 includes the service network 100 serving service targets 116, a computing and control subsystem 201, and databases 222, 224, and 226, all connected via a communication network 210. The service network 100 in FIG. 2 is a block diagram description of the service network of FIG. 1, including service nodes (such as distribution transformers) 102 and other network devices 104, 106, 108, injection nodes 114, and switches 110. The databases 222, 224, and 226 may hold service network topology data, maintenance schedule/task/team data, and service target accounts, respectively.

The computing and control subsystem 201 includes communication interfaces 202, system circuitry 204, input/output (I/O) interfaces 206, and display circuitry 208 that generates machine interfaces 210 locally or for remote display, e.g., in a web browser running on a local or remote machine. The machine interfaces 210 and the I/O interfaces 206 may include GUIs, touch sensitive displays, voice or facial recognition inputs, buttons, switches, speakers and other user interface elements. The I/O interfaces 206 may further include magnetic or optical media interfaces (e.g., a CDROM or DVD drive), serial and parallel bus interfaces, and keyboard and mouse interfaces.

The communication interfaces 202 may include wireless transmitters and receivers ("transceivers") 212 and any antennas 214 used by the transmit/receive circuitry of the transceivers 212. The transceivers 212 and antennas 214 may support Wi-Fi network communications, for instance, under any version of IEEE 802.11, e.g., 802.11n or 802.11ac. The communication interfaces 202 may also include wireline transceivers 216. The wireline transceivers 216 may provide physical layer interfaces for any of a wide range of communication protocols, such as any type of Ethernet, data over cable service interface specification (DOCSIS), digital subscriber line (DSL), synchronous optical network (SONET), or other protocol.

The system circuitry 204 may include hardware, software, firmware, or other circuitry in any combination. The system circuitry 204 may be implemented, for example, with one or more systems on a chip (SoC), application specific integrated circuits (ASIC), microprocessors, discrete analog and digital circuits, and other circuitry. The system circuitry 204 is part of the implementation of any desired functionality in the computing and control subsystem 201.

Figure 3:
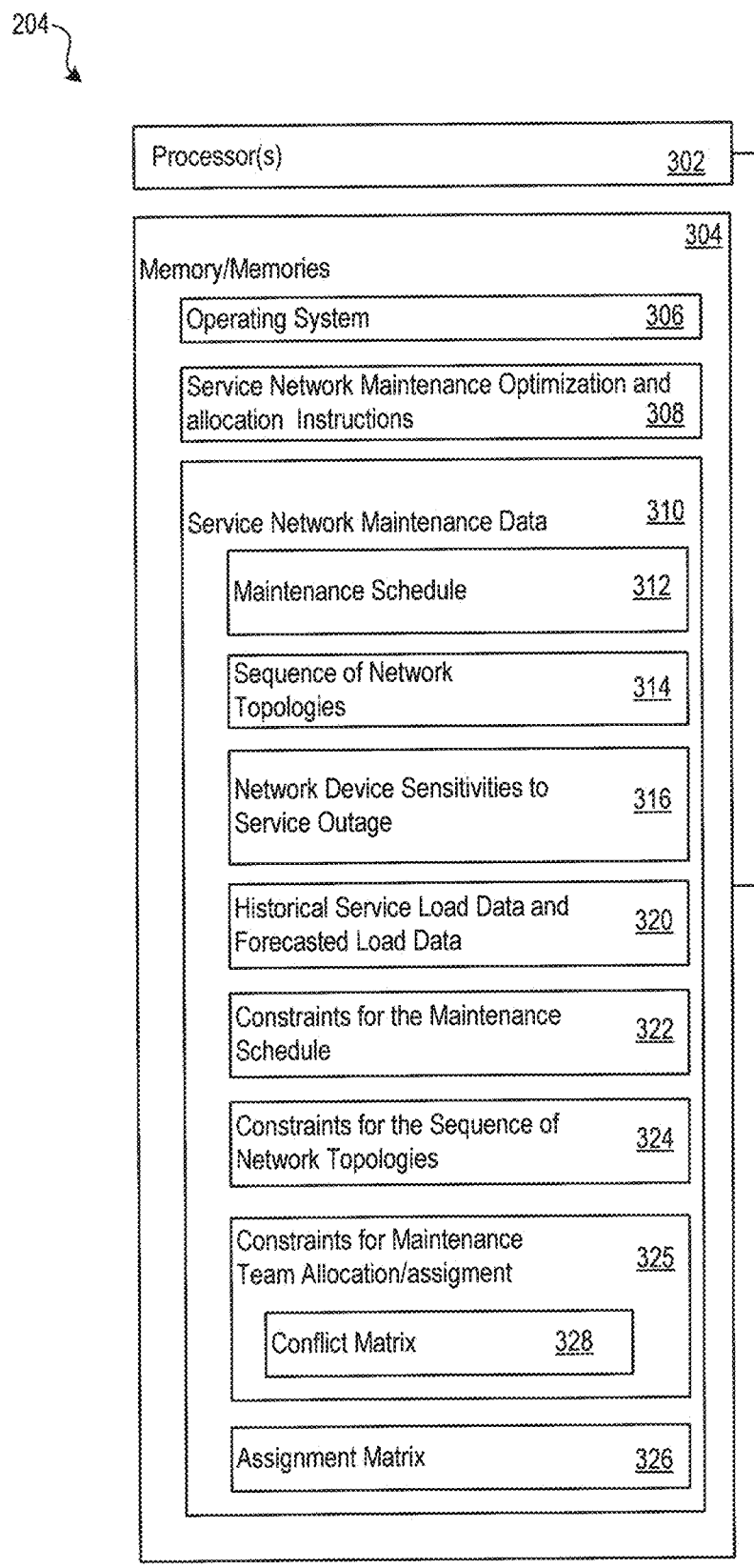
FIG. 3 shows an implementation of the system circuitry of FIG. 2.

As shown in FIG. 3 as an example, the system circuitry 204 may include one or more instruction processors 302 and memories 304. The memory 304 stores, for example, service network maintenance optimization and maintenance task allocation/assignment instructions 308 (referred to as instructions) and an operating system 306. In one implementation, the processor 302 executes the instructions 308 and the operating system 306 to carry out any desired functionality for the computing and control subsystem 201 of FIG. 2 The databases 222, 224 and 226 of FIG. 2 provide optimization parameters and network configuration information of the service network for instructions 308, operating system 306 to carry out maintenance optimization and allocation/assignment for the service network.

The memory 304 of FIG. 3 further stores service network maintenance data for the computing and control subsystem 201. For example, the memory 304 may store a maintenance schedule 312. The maintenance schedule 312 specifies how a set of N maintenance tasks are allocated in time. The maintenance schedule may be stored in various forms of data structure. For example, it may be stored as a table (a two-dimensional array) with one column for maintenance task identifiers for the set of N maintenance tasks and a corresponding column for identifiers of starting time slots for the set of N maintenance tasks among a sequence of available time slots for maintenance, as will be described in more detail bellow. Information about the maintenance tasks identified by the maintenance task identifiers and information about the time slots identified by time slot identifiers may be stored elsewhere in the memory 304 or obtained from the database 224. The memory 304 may further store time-dependent network topology 314. For example, the time-dependent network topology may be stored as a sequence of network topologies corresponding to the sequence of time slots. Network topology at each time slot may be stored as switching states (open or close) of the configurable switches that determined the network topology of the service network.

The maintenance schedule 312 and the sequence to network topologies 314 stored in the memory 310 may be updated during an optimization process. The final optimized maintenance schedule 312 and the final optimized sequence of network topologies may be then stored permanently via the I/O interface 206 of FIG. 2 in a nonvolatile storage such as a magnetic disk and a solid state memory, or in the databases 222 and 224.

The memory 304 may further store various constraints for the maintenance schedule 322, constraints for the network topology 324, and constraints for maintenance team allocation/assignment 325. The types of constraints and the forms in which they are stored will be described in more detail below. As an example, the constraints for maintenance team allocation/assignment may further include a conflict matrix 328 that will be described in more detail below.

The memory 304 may also store historical service load data and forecasted load data 320 obtained from the service target account database 226 of FIG. 2. The historical service load data and forecasted load data 320 may be used in the maintenance schedule and network topology optimization, as will become clear below.

The memory 304 may further include an assignment matrix 326 calculated and used for allocating the set of N maintenance tasks for a set of M maintenance teams. Information about the maintenance teams may be obtained from the database 224. As will be described in further detail below, the assignment matrix may be determined during an assignment optimization process for maintenance task and the final optimized assignment matrix may be permanently stored in the nonvolatile storage.

Figure 4:
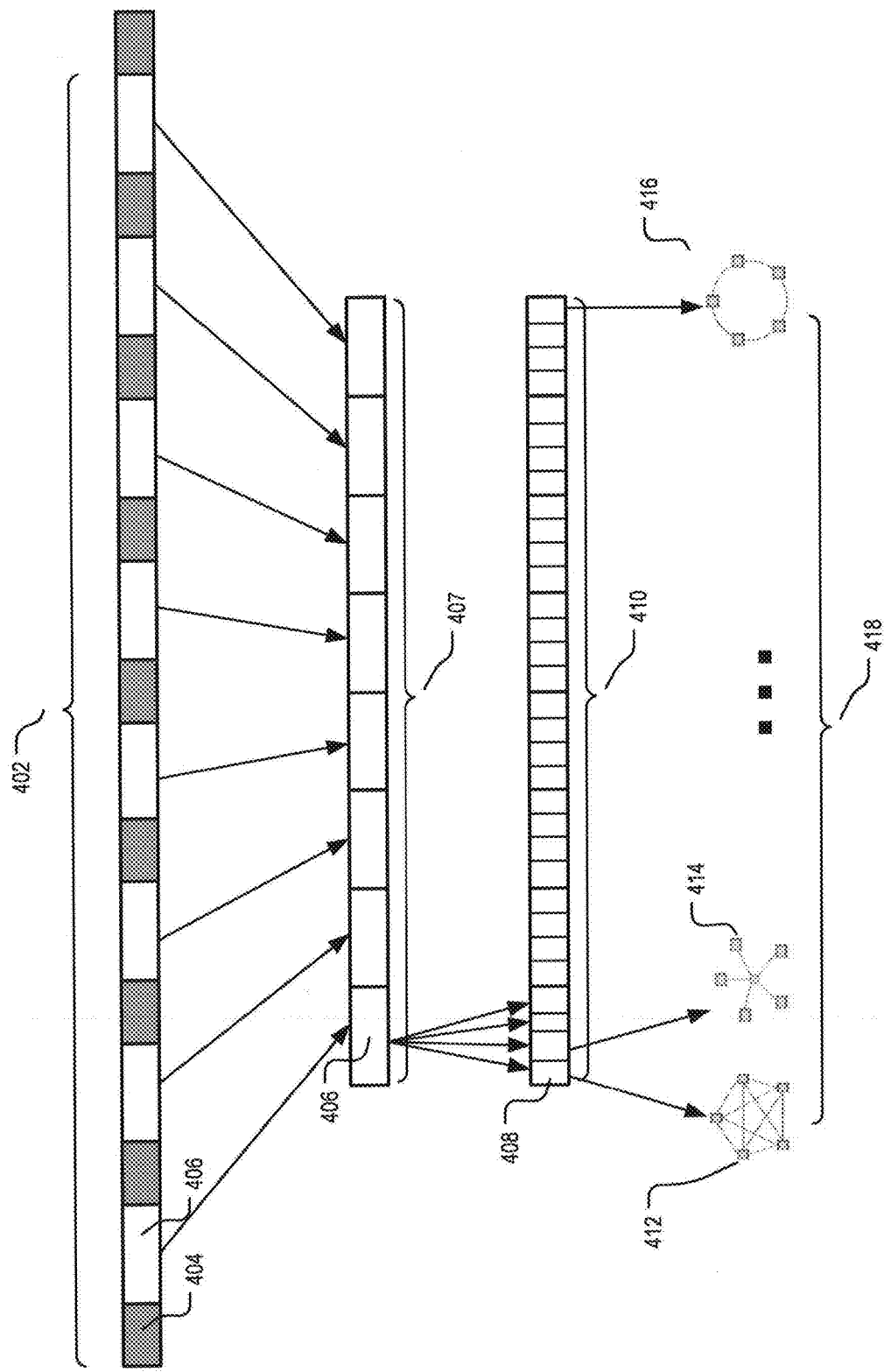
FIG. 4 shows an implementation of a maintenance time sequence for network devices in the service network.

FIG. 4 illustrates an example for maintenance time slot configuration. As will be shown below, the time slot configuration of FIG. 4 is particularly suitable for maintenance schedule and topology optimization algorithms based on integer programming or mixed integer programming (MIP). Specifically, an operational time period 402 for the service network may be divided into alternate time windows 404 and 406. The time period 402, for example, may be a month. Time windows 404 represent time periods when maintenance of network devices is not allowed whereas time windows 406 represent time periods when maintenance is allowed. For example, time windows 404 may include time periods such as weekends, holidays, and evening/night hours when the maintenance teams are not available. Time windows 406, on the other hand, may include time periods of normal business hours. Alternatively, for some service networks which mainly provide services during normal business hours and whose maintenance is preferred in non-business hours, time windows 406 for performing maintenance tasks may include weekends, holidays, and evenings/night hours rather than normal business hours.

The sequence of time windows 406 allowable for maintenance is shown by a time window sequence 407. Each time window 406 may be further divided into a group of a predefined time unit 408 for maintenance. For example, maintenance work may be scheduled on hourly basis and the predefined time unit may correspondingly be an hour. The time window sequence 407 may consequently be converted into a time sequence 410 of the predefined time units. The set of N maintenance tasks may then be scheduled onto the time sequence 410. The network devices under maintenance may vary from one time unit to the next for a particular maintenance schedule. Each predefined time unit in the time sequence 410 may thus correspond to a network topology, such as 412, 414, and 416. The network topology may vary from one time unit to another. The time sequence 410 may thus correspond to a sequence of network topologies shown by 418. In the disclosure below, the term "time unit", "maintenance time unit", "time slot", and "maintenance time slot" are used interchangeably. The time slots or time units in the maintenance time sequence may thus be identified, for example, by indexes 1 to L and may facilitate a use of integer programming or MIP algorithms in maintenance schedule and network topology optimization described below.

Figure 5:
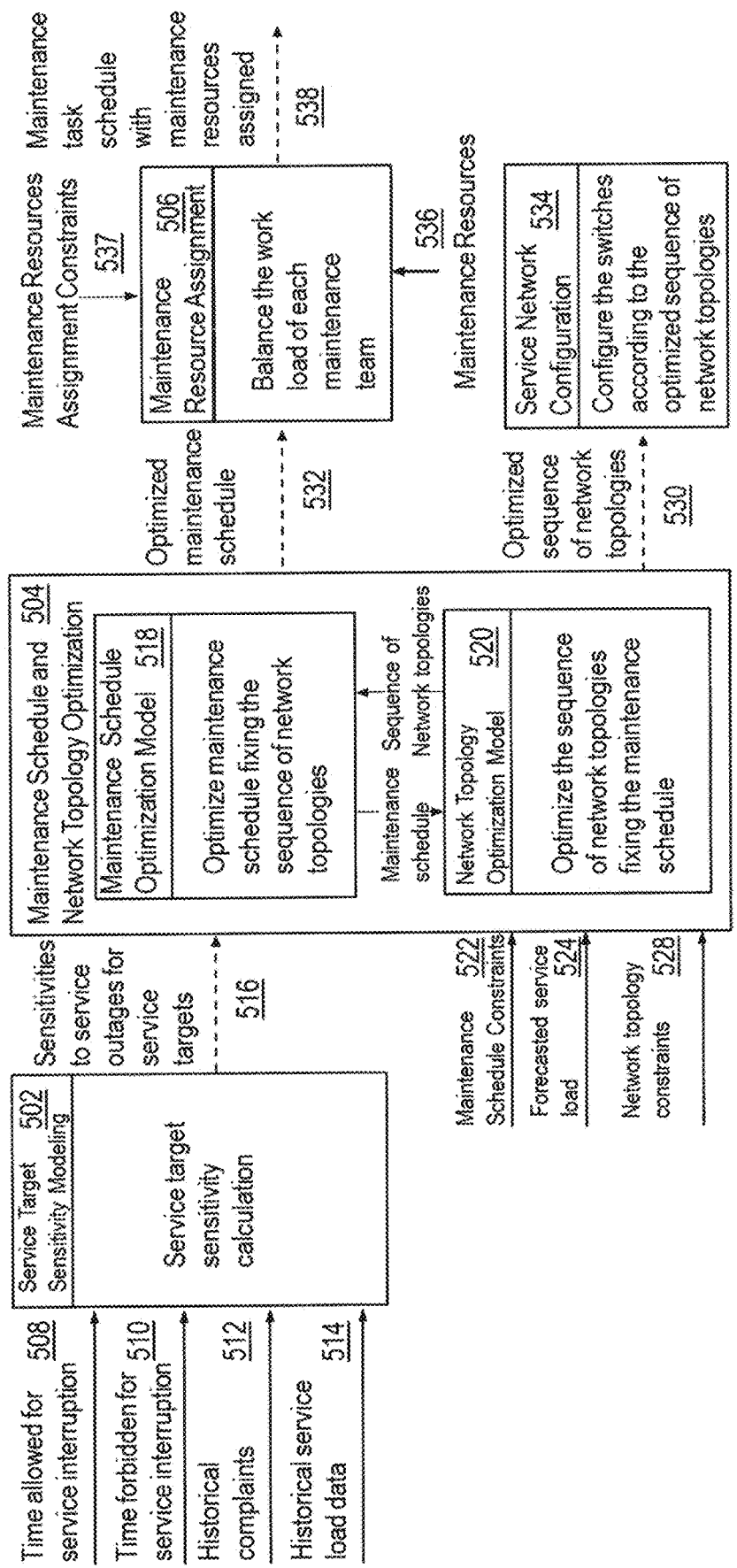
FIG. 5 is a flow diagram of logic that the system may implement for scheduling, work allocation/assignment, and network topologies for maintenance operations of the service network.

FIG. 5 is a flow diagram of logic that the system may implement for scheduling, work allocation/assignment, and network topologies for maintenance operations of the service network. The implementation may include (1) modeling of the sensitivities to service outages for the service targets of the service network in block 502, (2) determination of the maintenance schedule and the sequence of network topologies for minimizing impact of maintenance on the services provided to the service targets by the service network under a set of constraints for maintenance schedule and a set of constraints for the network topology in bock 504, (3) allocation/assignment of maintenance resources according to the maintenance schedule in block 506, and (4) configuration of the configurable switches of the service network according to the optimized sequence of network topologies in block 534.

Specifically, in block 502, the sensitivities to service outages for the service targets may be modeled and calculated based on various input data related to the service network and the service targets. For example, these input data may include, for each service target, historical data for complaints made 512, and historical service load data 514. The sensitivities may additionally be based on other predefined input data for each service target, such as time allowed for service interruption 508 and time forbidden for service interruption 510. The output of the sensitivity modeling block 502 is a quantified measure of the sensitivities of the service targets to service outages, as shown by 516. The input data 508, 510, 512, and 514 for the service target sensitivity modeling block 502 are generally time-dependent and thus the sensitivity values 516 outputted by the sensitivity modeling likewise is time-dependent. In the context of the maintenance time sequence 410 of FIG. 4, the sensitivity value for each service target may vary from one time unit to the next in the maintenance time sequence 410.

In block 504, the maintenance schedule and network topology optimization may be implemented as an iterative improvement of maintenance optimization sub-block 518 and network topology optimization sub-block 520. Thus, a two dimensional optimization process (the dimension of maintenance schedule and the other dimension of network topology) may be separated into and iterated between two sub-processes. For a sub-process involving optimization of one of the two dimensions, the other dimension may be fixed. For example, the sequence of network topologies may be fixed when the maintenance schedule is optimized in sub-block 518 for minimizing the impact of the maintenance of the network devices on the service provided by the service network to the service targets. The optimized maintenance schedule may then be fixed in sub-block 520 for optimization of the sequence of network topologies. After the optimization of one dimension, the other dimension may become un-optimized. Sub-blocks 518 and 520 thus iterates until some predefined condition is met. For example, the iteration may stop when maintenance impact improvement on the sequence of topologies or the maintenance schedule can no longer be made, or the number of iteration has reached a predefined maximum number.

Forecasted service load data 524 for the service targets may be derived from historical service load data and used as one of the inputs to block 504 for evaluating the amount of lost service for service targets affected by maintenance. Network topology constraints 528 and maintenance scheduling constraints 522 may be further input into sub-blocks 520 and 518, respectively.

One of the outputs of the optimization block 504, the optimized sequence of network topologies 530 may be input into the service network configuration block 534. Each configurable switches of the service network may be automatically configured to an open or close state according to the time-dependent network topology embodied in 530 as a sequence of network topologies corresponding to the maintenance time sequence. The other output of block 504, the optimized maintenance schedule 532, together with information about the maintenance resources available such as the maintenance teams 536 and maintenance resource allocation/assignment constraints 537, may be input into the maintenance resource allocation/assignment block 506. The output of the maintenance resource allocation/assignment block 506 maybe a maintenance resource assignment corresponding to the optimized maintenance schedule based on achieving a predefined maintenance resource allocation/assignment metric. For example, the maintenance resource may be a number of maintenance teams and they may be assigned to the maintenance tasks for achieving balanced workload among the maintenance teams.

Figure 6:
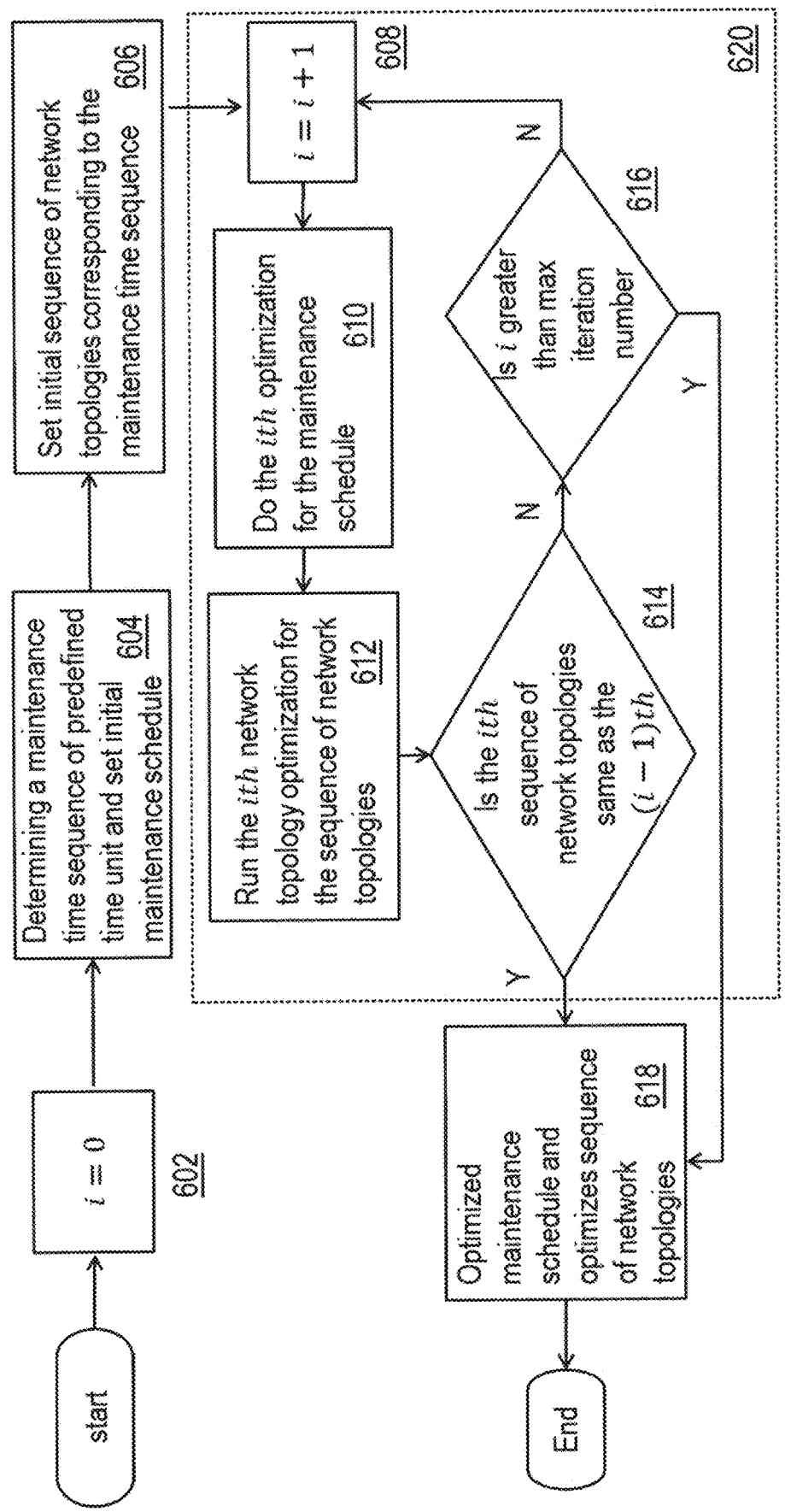
FIG. 6 is a flow diagram of logic that the system may implement for an iterative optimization of maintenance schedule and network topologies for the service network.

FIG. 6 is a flow diagram of logic that the system may implement for an iterative optimization of the maintenance schedule and the sequence of network topologies for the service network. FIG. 6 thus may be an exemplary implementation of block 504 of FIG. 5. In block 602, the number of iteration i is set to 0. In block 604, the maintenance time sequence is determined based on the principle illustrated in FIG. 4 and described above. In block 606, an initial arrangement for the maintenance schedule for the set of N maintenance tasks on the maintenance time sequence with L time slots and an initial arrangement for the sequence of network topologies corresponding to the maintenance time sequence are determined. It may be preferable that the initial maintenance schedule and sequence of network topologies are determined such that the set of constraints for maintenance scheduling and the set of constraints for network topology are met.

Blocks 608, 610, 612, 614 and 616 forms an iteration loop 620 for the optimization of the maintenance schedule and the sequence of network topologies, starting from their initial values determined from block 606. In block 608, the number of iteration i is advanced by 1. In block 610, the maintenance schedule is optimized in a current iteration from the optimized maintenance schedule in a previous iteration with the sequence of network topology from the previous iteration fixed. The optimization of the maintenance schedule 610 by itself may be an iterative process, as will be described in more detailed below in an exemplary implementation.

The optimization block 610 for maintenance schedule may be implemented as an iterative minimization of a first maintenance-induced impact on the service network. The first maintenance-induced impact may be, for example, a sum, over all service targets and over all time units (or time slots) of the maintenance time sequence, a maintenance-induced impact for each service target at each time unit of the maintenance time sequence. The maintenance-induced impact for each service target at each time unit of the maintenance time sequence may be determined by multiplying a forecasted service load loss and unit value for lost service during each time unit for each service target. The forecasted service load loss during the time unit for each service target may be based on forecasted service load data for each service target during that time unit. In one exemplary implementation, the forecasted service load data may be an average of historical service loads during the same hour of the same day of multiple previous periods (months, for example) for each service target. Those of ordinary skill in the art understand that the forecasted service load loss is non-zero for a service target during a time unit only if that service target is affected by the maintenance schedule, i.e., its service is provided by a network device due for maintenance during that time unit according to the maintenance schedule. The unit value for service load for each service target at each time unit may be determined by a price of service (charged by the provider of the service network) adjusted by the time-dependent sensitivity to service outage for each service target (at each time unit, due to the time-dependency of the sensitivity), as will become clear from the example below.

The optimization process in block 610 may be subject to the set of constraints for maintenance schedule. For example, a maintenance task of the set of N maintenance tasks may be constrained to consecutive time units (or time slots) in the maintenance time sequence when that maintenance task takes multiple time units to complete. Other types of scheduling constraints will become clear in the example implementation described in more detail below.

Likewise, the optimization block 612 for the sequence of network topology may also be implemented as an iterative minimization of a second maintenance-induced impact on the service network. The second maintenance-induced impact on the service network may include the first maintenance-induced impact discussed above. In addition, the second maintenance-induced impact may include an adverse effect from having to reconfigure the switches of the service network from one network topology to the next network topology of the sequence of network topologies during the maintenance time sequence. The adverse effect (or impact) of the switch reconfiguration may be represented by a total number of switching actions that need to be performed for implementing the entire sequence of network topologies. The second maintenance-induced impact on the service network may then be a weighted sum of the first maintenance-induced impact and the total number of switching actions. Similar to block 610, the optimization of the sequence of network topologies in block 612 may be subject to the set of constraints for network topology for the service network. For example, in an electric grid, it may be required for safety and network management purposes that the configurable switches be configured such that each network device is energized by at most one injection node at any given time. Other examples of network topology constraints will become clear in the example implementation described in more detail below.

The optimization processes in blocks 610 and 612 above are thus both based on iterative minimization of maintenance-included impact on the service network under the set of constraints for maintenance schedule and the set of constraints for network topology. The optimization processes may be based on integer programming and/or Mixed Integer Programming (MIP) algorithms described above and in more detail in the example below.

In block 614, it may be determined whether the current optimization on the sequence of network topologies has made any improvement in terms of the maintenance impact on the service network. In other words, it may be determined in block 614 whether the network topology optimization in block 612 has made any modification to the sequence of network topologies from the previous iteration. If no improvement or modification has been made, the iterative optimization loop 620 ends and the most recently optimized maintenance schedule and sequence of network topologies are passed to block 618 for further processing. Otherwise, it is determined in block 616 whether the number of iterations of the iteration loop has reached a predefined maximum iteration number. If the maximum iteration number has been reached, the iteration loop 620 ends and the most recently optimized maintenance schedule and sequence of network topologies are passed into block 618 for further processing. Otherwise the number of iterations, i, is further advanced by 1 in block 608 and the optimization loop 620 continues.

In block 618, the optimized maintenance schedule and the optimized sequence of network topologies are obtained and may be stored permanently in non-volatile storage via the I/O interface 206 of FIG. 2. The optimized maintenance schedule and the optimized sequence of network topologies may then be used for network topology configuration and maintenance resource allocation/assignment, as respectively shown by block 506 and 534 of FIG. 5.

The disclosure below provides examples of detailed implementation of the principles described by FIG. 4 to FIG. 6 in an electric grid. An exemplary modeling for the time-dependent sensitivities to service outages is first described, as it is used in both the maintenance schedule and network topology optimization. The time-dependent sensitivities to service outages may be evaluated at the service target level for each service target. Alternatively, the time-dependent sensitivities to service outages may be evaluated at the distribution transformer level (for a service network in the form of electric grid). Correspondingly, calculation of the first and second maintenance-induced impact due to maintenance for scheduling and network topology optimization described above may be carried out by summing over service targets or summing over distribution transformers. The following detailed description and formulation take sensitivity evaluation at the target level as an example.

Figure 7:
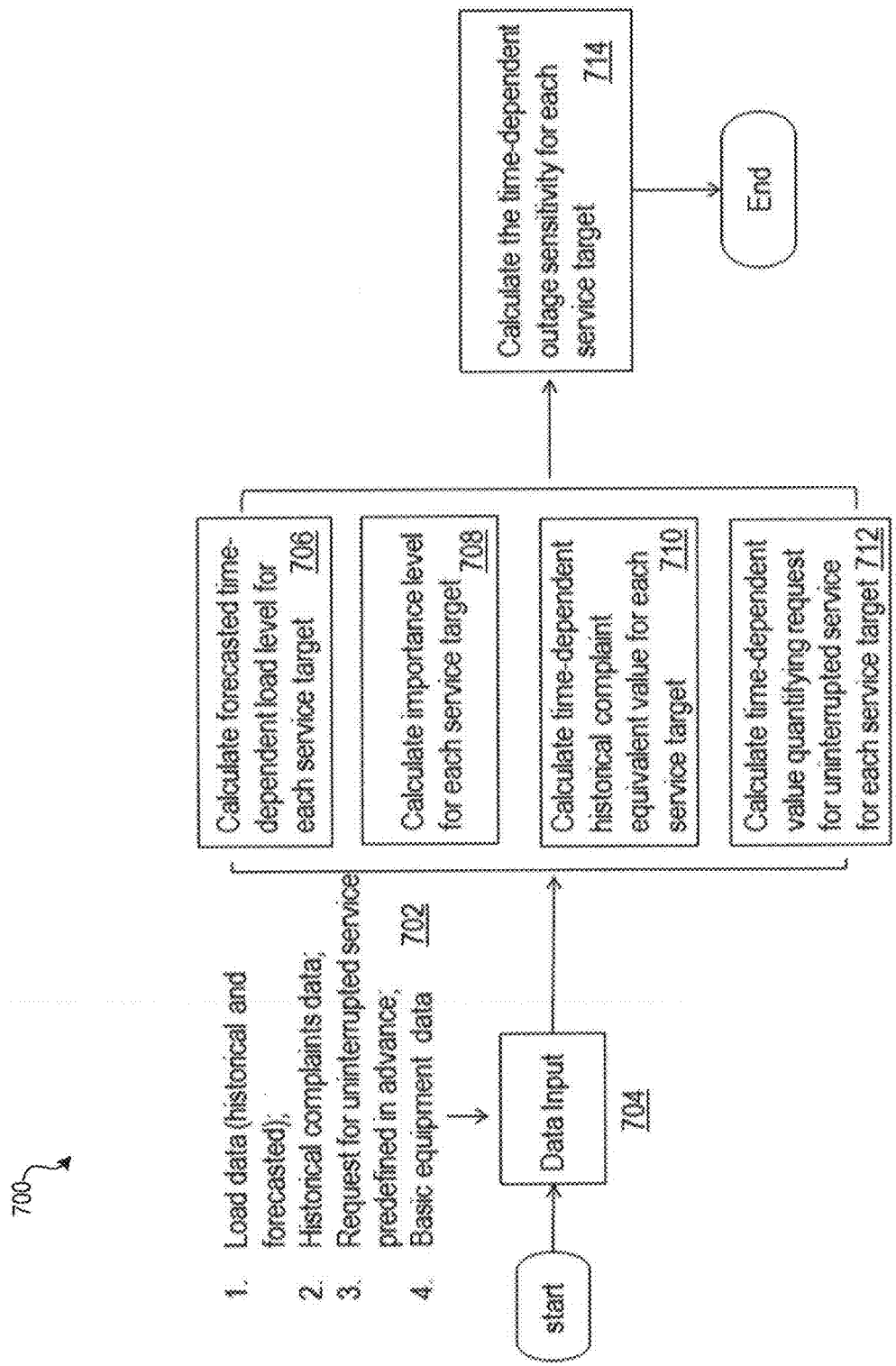
FIG. 7 illustrates a flow diagram of logic that the system may implement for determining service target sensitivities to service outage.

FIG. 7 illustrates a flow diagram of logic 700 that the system may implement for determining service target sensitivities to service outage. Specifically, sensitivity to service outage for each service target may be modeled based on historical load data and forecasted load data of each service target, historical complaints data, request for uninterrupted service predefined in advance, and basic equipment data, as shown by 702. The input historical data may be obtained from the historical service target account database 226 of FIG. 2 and input into the sensitivity model 700 at block 704. The time-dependent sensitivity for the jth service target of the set of service targets at kth hour of the maintenance time sequence may be represented by $S_{jk}$ and may, for example, contain four different components calculated as shown in blocks 706, 708, 710, and 712 and represented by the four terms in:

$$S_{jk} = \beta_1 X_{1,jk} + \beta_2 X_{2,jk} + \beta_3 X_{3,jk} + \beta_4 X_{4,jk}, \quad (1)$$

where $X_{1,jk}$ represents the forecasted load level of the distribution transformer supplying service to the service target at the kth hour; $X_{2,jk}$ represents the forecasted importance level of the distribution transformer supplying service to the service target at the kth hour; $X_{3,jk}$ represents forecasted service outage complaint equivalent value for the service target at the kth hour; and $X_{4,jk}$ represents the forecasted equivalent value for requests for uninterrupted service for the service target at the kth hour. All forecasts above may be made based on historical data at equivalent hour and/or other predefined data. $S_{jk}$ may thus be a weighted sum of the four terms described above, as calculated in block 714. The weighting coefficients $\beta_1$, $\beta_2$, $\beta_3$, and $\beta_4$ may be determined by experts of the electric grid. In one implementation $\beta_1$, $\beta_2$, $\beta_3$, and $\beta_4$ may be respectively set as 0.25.

The first term $X_{1,jk}$, for example, may be calculated in block 706 according to the following formula:

$$X_{1,jk} = \alpha_1 \left( \frac{P_{jk} - P_{j,min}}{P_{j,max} - P_{j,min}} \right) \times 100 + \alpha_2 \left( \frac{SS_j}{S} \right), \quad (2)$$

where $P_{jk}$ is the forecasted load level for the distribution transformer supplying service to the jth service target at the kth hour; $P_{j,min}$ and $P_{j,max}$ are respectively the forecasted minimum and maximum next-month load level for the distribution transformer supplying service to the fth service target estimated from the historical load data; $SS_j$ represents the capacity of the distribution transformer supplying service to the j th service target; and S represents the total capacity of the service network. The weight factors $\alpha_1$ and $\alpha_2$ are determined by expert evaluation methods. For example, in one implementation, $\alpha_1$ and $\alpha_2$ are respectively set as 0.7 and 0.3.

The second term $X_{2,jk}$, for example, may be calculated in block 708 according to the following formula:

$$X_{2,jk} = y_{jk} \quad (3)$$

Where $y_{jk}$ represents the importance level of the j th service target at the kth hour. The importance level of the jth service target may be derived from various data mining techniques.

The third term $X_{3,jk}$, for example, may be calculated in block 710 according to the following formula:

$$X_{3,jk} = c_1 \times C_{jk} \quad (4)$$

where $c_1$ is an expert determine weight value between, for example 0.8 and 1.2 and $c_{jk}$ is a historical outage equivalent value of the j th service target at the kth hour.

The fourth term $X_{4,jk}$, for example, may be calculated in block 712 according to the following formula:

$$X_{4,jk} = U_{jk} \times 50 + (1 - U_{jk}) \times 12.5 \quad (5)$$

where $U_{jk} \in [0,1]$ is a binary value and represents the equivalent value for request for uninterrupted service for the j th service target at the kth hour.

As discussed above, in some alternative implementation, the sensitivity calculation may be aggregated to the network device or distribution transformer level. For example, the subscribe j in Equations (1)-(5) may refer to j th network device or distribution transformer rather than jth service target, and Equation (3) may be modified to be an average importance level of all service targets connected to it.

For an exemplary implementation of maintenance schedule optimization, the maintenance time sequence shown in FIG. 4 may be used. For example, the maintenance time sequence may contain L time unit or time slot. The maintenance thus may be conveniently represented by a set of integer index {1, 2, 3, . . . , L}. With this simplified time scheme, the maintenance schedule optimization may be conveniently carried out using an integer programming approach with scheduling constraints. The time indices may be converted to actual times (e.g., a particular hour of a particular day) using a simple correspondence inherent in FIG. 4 after the optimization process.

Using the integer programming approach, the maintenance schedule optimization process may be designed to minimize the first impact of service loss of maintenance of the network devices $C_{loss}{}^s$:

$$C_{loss}{}^s = \Sigma_{i=1}{}^{L_m} \Sigma_{d=0}{}^{D_i-1} \Sigma_{\alpha \in outLoad(X_i)} P_\alpha (X_i + d) \quad (6)$$

The following lists the qualities represented by each symbol:

$L_m$: the number of network device to be maintained;

i: the ith network device to be maintained (note that symbol i was used previously as the iteration index in FIG. 6 and its use is recycled here);

$D_i$: the maintenance working duration for equipment imeasured in terms of the predefined time unit;

d: time points within $D_i$;

a: the ath service target;

$P_a(X_i+d)$: forecasted active power of the ath service target at time $X_i+d$ $\rho_a(X_i+d)$: price for lost service of the ath service at time $X_i+d$ adjusted by the sensitivity values; and outLoad($X_i$): the set of service targets with service outage due to the maintenance work started at time $X_i$, as determined by the network topology.

In the particular construction of $C_{loss}{}^s$ above, the time-dependent network topology or the sequence of network topologies determines the outLoad($X_i$). The time-dependent sensitivity to service outage for each service target is used in deriving $\rho_\alpha(X_i+d)$. In one implementation that keeps the integer programming approach simple, $\rho_\alpha(X_i+d)$ may be given a discrete set of z values based on the sensitivity values. For example, the sensitivity range may first be divided into z values between 0 and 100. $\rho_\alpha(X_i+d)$ may then be determined according to the following:

$$\rho_a(X_i+d) = \begin{cases} \rho_n, & \frac{z-1}{z}*100 \le S_a(X_i+d) < 100 \\ \vdots \\ \rho_2, & \frac{1}{z}*100 \le S_a(X_i+d) < \frac{2}{z}*100 \\ \rho_1, & 0 \le S_a(X_i+d) < \frac{1}{z}*100 \end{cases} \quad (7)$$

Here the sensitivity $S_\alpha(X_i+d)$ can be derived from the $S_{jk}$ described above, as the subscript α corresponds to the service targets and $X_i+d$ is related to time slotk in the maintenance time sequence.

The minimization of $C_{loss}{}^s$ may be further subject to various scheduling constraints. For example, starting time $X_i$ ideally may be any of the time slot in the maintenance time sequence {1, 2, . . . , L}. However, to ensure that a maintenance task finishes within the end of the maintenance time sequence, the following constraints may be constructed in the integer programming optimization process:

$$1 \le X_i \le L-D_i+1 \forall i \in L_m \quad (8)$$

As another example of scheduling constraint, it may be required that at most one maintenance task is ongoing during each time slot of the maintenance time sequence. In a CP form, this constraint may be set up as:

$$X_j+D_j \le X_i \text{ if } X_i-X_j>0, \quad (9)$$

or $$X_i+D_i \le X_j \text{ if } X_i-X_j<0, \quad (10)$$

where $\forall i,j \in \{L_m | i \ne j\}$. The scheduling constraints above are only examples. Other types of scheduling constraints for the service network are contemplated.

The above maintenance schedule optimization scheme is implemented in a 10 kV electricity distribution system with 8 distribution transformers each serving one service target. The single line diagram of this distribution system is shown in FIG. 1 (note that while FIG. 1 is used for illustrative purposes that each distribution transformer may support multiple service targets, it is assumed that each distribution transformer only serves one service target for the example here). The information for the service targets including service data for one entire month is available in hourly basis. The maintenance scheduling time period is set to that entire month. Four further assumptions may be made:

(1) The service target sensitivity values have been calculated as the input to maintenance scheduling optimization;

(2) The maintenance work can only be scheduled on Monday to Friday and from 8 AM to 5 PM during the day time and overtime work for maintenance is not allowed, and the minimum maintenance working time for each network device is one hour, leading to a converted integer maintenance time sequence for possible scheduling time slots of {1, 2, 3, . . . 198} over one month;

(3) Three network devices in FIG. 1 need to be scheduled for maintenance: bus 210004 (also labeled as 122), switch 124 between bus 210002 and 210023, and line 126 between bus 210022 and distribution transformer 204005, as shown in FIG. 1 by symbols 104;

(4) The maintenance working durations for the three network devices above are: 2 hours, 3 hours and 5 hours, respectively.

For comparison purposes, the maintenance schedule optimization is first carried out without considering service target sensitivities to service outage. In other words, direct cost for lost service rather than sensitivity adjusted cost for lost service of Equation (7) is used and $\rho_\alpha$ is set as a constant value ¥50/kWh for all service targets. The maintenance schedule optimization result is shown in Table 1 with a total impact of (86634.9 under the optimized maintenance schedule.

TABLE 1

Scheduling without Considering Service Target Sensitivity

| Network Device | Start Time | Maintenance Impact (¥) |
|---|---|---|
| 21004 | 13 PM Day 21 | 18438.81 |
| 124 | 13 PM Day 16 | 58390.19 |
| 126 | 11 PM Day 2 | 8805.94 |

For service target sensitivity based maintenance schedule optimization, $\rho_\alpha(X_i+d)$ is divided into three levels in one implementation:

$$\rho_a(X_i+d) = \begin{cases} 70000, & 60 \le S_a(X_i+d) < 100 \\ \vdots \\ 50000, & 30 \le S_a(X_i+d) < 60 \\ 30000, & 0 \le S_a(X_i+d) < 30 \end{cases} \quad (11)$$

The maintenance schedule optimization result with the service target sensitivities to service outages considered is shown in Table 2 below with a total impact of (74182.7 due to maintenance outages, representing a significant improvement over the maintenance schedule optimization without considering service target sensitivities. The improvement suggests that the optimization with the sensitivities of service targets considered has tried to schedule the maintenance at time when the sensitivity values are lower.

TABLE 2

Scheduling with Target Sensitivity Considered

| Network Device | Start Time | Start Time | Maintenance Impact (¥) |
|---|---|---|---|
| 21004 | 13 PM Day 22 | 14 PM Day 22 | 18663.2 |
| 124 | 12 PM Day 21 | 14 PM Day 21 | 50236 |
| 126 | 11 PM Day 2 | 15 PM Day 2 | 5283.56 |

The sensitivity values of those service targets affected by the three network devices being maintained are given in Table 3, Table 4, and Table 5, respectively.

TABLE 3

Sensitivity of Affected Service Target during Maintenance of 21004

| Affected Network Device | Time | Sensitivity | Impact Price (¥/MWh) |
|---|---|---|---|
| 204008 | 13 PM Day 22 | 41.43 | 50000 |
|  | 14 PM Day 22 | 41.05 | 50000 |
| 204009 | 13 PM Day 22 | 44.28 | 50000 |
|  | 14 PM Day 22 | 34.63 | 50000 |
| 204010 | 13 PM Day 22 | 42.60 | 50000 |
|  | 14 PM Day 22 | 42.21 | 50000 |

TABLE 4

Sensitivity of Affected Service Target during Maintenance 126

| Affected Network Device | Time | Sensitivity | Impact Price (¥/MWh) |
|---|---|---|---|
| 204005 | 11 AM Day 2 | 23.42 | 30000 |
|  | 12 AM Day 2 | 23.08 | 30000 |
|  | 13 AM Day 2 | 27.04 | 30000 |
|  | 14 PM Day 2 | 21.80 | 30000 |
|  | 15 PM Day 2 | 24.49 | 30000 |

The monthly average sensitivity values of service target 204008, 204009 and 204010 are 47.15, 42.11 and 40.05, respectively. Therefore, it is not possible to arrange maintenance for equipment 210004 at the time point when economic loss cost is less than 50000¥/MWh according to Equation (11). On the contrary the sensitivity value of service target 204004 is low, which means the maintenance for equipment 126 can be scheduled at time when loss price is 30000¥/MWh.

The optimized maintenance schedule may then be fixed in the network topology optimization in 520 of FIG. 5 (or 612 of FIG. 6). Using a mixed integer programming (MIP) approach, the second impact of maintenance on the service network for network topology optimization to be minimized, $C_{loss}^T$, may be constructed as:

$$C_{loss}^T = \omega_{sw} * sn + C_{loss}^s. \quad (12)$$

Thus, in addition to the first impact of maintenance included in the scheduling optimization, the second impact for topology optimization may further include the adverse effect of switching action that are needed for configuring a particular sequence of network topologies. Here, sn is total number of switching actions. The proportion of the switching impact within the total maintenance impact $C_{loss}^T$ may be controlled by the factor $\omega_{sw}$. The switching impact is included in the network topology optimization because, without including the switching impact, the optimized sequence of network topologies may incur excessive network reconfiguration and a large number of switching actions, which may, for example, adversely reduce the life of the configurable switches of the service network. But weighing against the switching impact too heavily (large $\omega_{sw}$) during the topology optimization may result in incomplete switching actions causing load shedding when the cost for extra switching action is more than the cost for loss of service targets' loadings. Under such circumstance the optimization solution may choose to un-restore out-of-service load of service target due to maintenance work instead of taking more switch actions to do service restoration so that the objective of minimizing total cost is satisfied. An appropriate weight $\omega_{sw}$, for example, may be set as the minimum load of the affected service targets multiplied by the minimum service loss cost of the affected targets.

TABLE 5

Sensitivity of Affected Service Target during Maintenance 124

| Affected Network Device | Time | Sensitivity | Impact Price (¥/MWh) |
|---|---|---|---|
| 204001 | 12 AM Day 21 | 26.32 | 30000 |
|  | 13 AM Day 21 | 25.94 | 30000 |
|  | 14 PM Day 21 | 33.80 | 50000 |
| 204003 | 12 AM Day 21 | 26.96 | 30000 |
|  | 13 AM Day 21 | 25.41 | 30000 |
|  | 14 PM Day 21 | 27.64 | 30000 |
| 204004 | 12 AM Day 21 | 49.31 | 50000 |
|  | 13 AM Day 21 | 41.83 | 50000 |
|  | 14 PM Day 21 | 39.27 | 50000 |
| 204005 | 12 AM Day 21 | 32.03 | 50000 |
|  | 13 AM Day 21 | 22.47 | 30000 |
|  | 14 PM Day 21 | 22.15 | 30000 |
| 204007 | 12 AM Day 21 | 26.74 | 30000 |
|  | 13 AM Day 21 | 35.69 | 50000 |
|  | 14 PM Day 21 | 47.81 | 50000 |
| 204008 | 12 AM Day 21 | 57.41 | 50000 |
|  | 13 AM Day 21 | 50.79 | 50000 |
|  | 14 PM Day 21 | 44.01 | 50000 |
| 204009 | 12 AM Day 21 | 36.44 | 50000 |
|  | 13 AM Day 21 | 35.34 | 50000 |
|  | 14 PM Day 21 | 38.01 | 50000 |
| 204010 | 12 AM Day 21 | 64.54 | 70000 |
|  | 13 AM Day 21 | 54.90 | 50000 |
|  | 14 PM Day 21 | 63.45 | 70000 |

The goal of the network topology optimization is to find the sequence of network topologies that minimizes $C_{loss}^T$ with a given maintenance schedule as determined in the scheduling optimization process described above. Sensitivities of the service targets to service outages is preferably considered within the second term of $C_{loss}^T$ in Equation (12), similar to the description above for the optimization for maintenance schedule. Further, the topology optimization may be subject to a set of constraints for network topology. For example, the set of topology constraints for an electric grid network may include but are not limited to:

(1) each distribution transformer may only be energized from one injection node;

(2) the network device under maintenance must be isolated by opening all of its neighbor switches.

Other constraints that are not topology specific, such as DC power flow constraints may also be considered in the topology optimization process.

Figure 8:
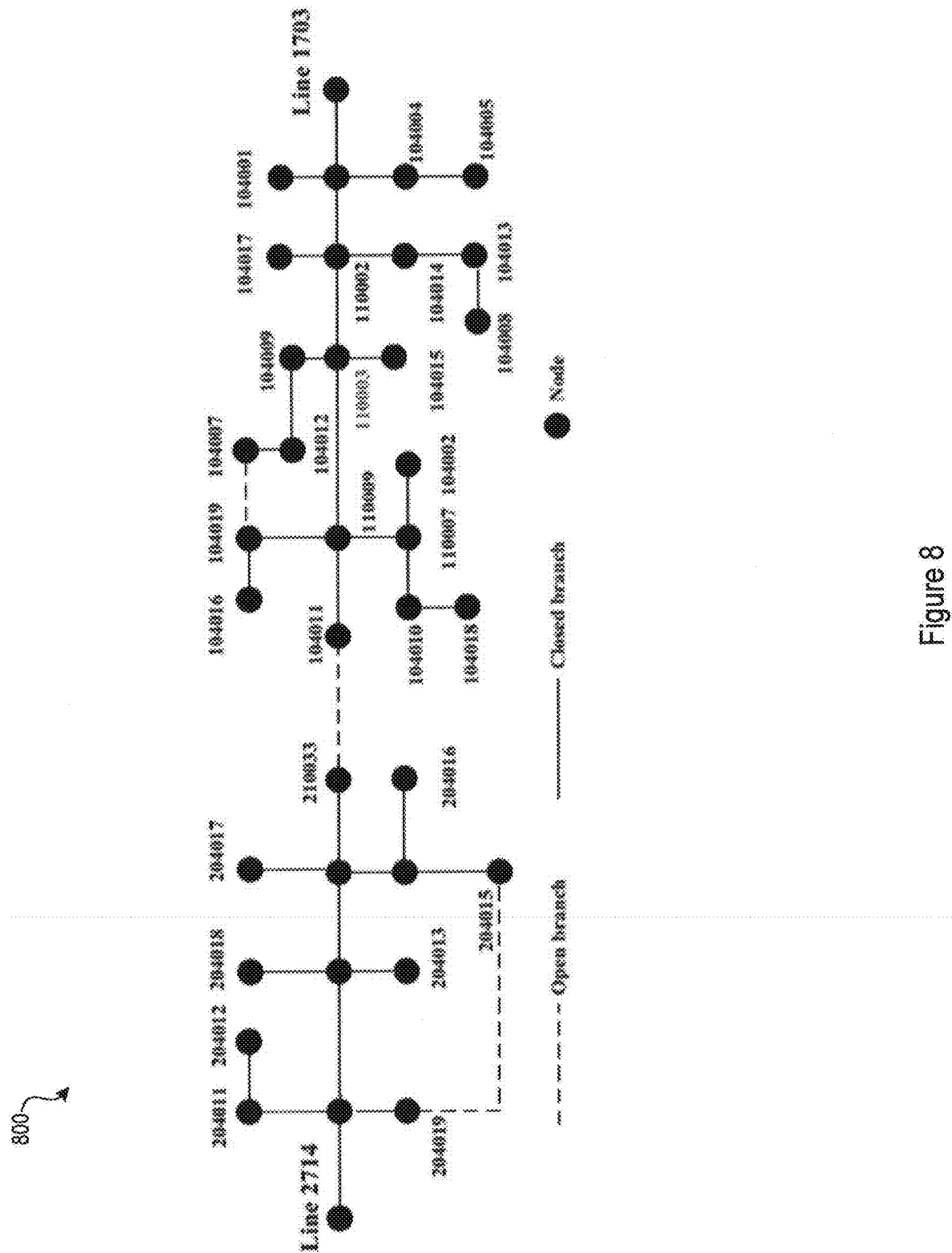
FIG. 8 illustrates an electric grid service network topology.

As an example, the topology optimization above based in MIP may be implemented in a 10 kV electrical distribution grid system 800 shown as a single line diagram in FIG. 8 with 25 service targets listed in Table 6 and shown in FIG.

8. The system 800 includes two injection nodes shown as Line 2714 and Line 1703. The service load data and calculated sensitivities for the 25 service targets for one month are shown in Table 6.

For illustrative simplicity, it is assumed that only one network device, 110003 needs to be maintained and the schedule for maintenance is fixed for network topology optimization. For comparison, optimization of network topology is first performed without considering the sensitivities of service targets to service interruption. In other words, it is first assumed that the unit cost of service loss for all service targets is the same and around ¥50/kWh. Results for network topology optimization without considering the sensitivities of the service targets are given in Table 7.

TABLE 6

Service Load and Sensitivity

| Service Targets | load | Sensitivity | Service Targets | load | Sensitivity |
|---|---|---|---|---|---|
| 104001 | 0.031 | 21.109 | 104002 | 0.056 | 24.774 |
| 104004 | 0.033 | 20.526 | 104004 | 0.023 | 30.328 |
| 104007 | 0.133 | 24.739 | 104008 | 0.051 | 35.991 |
| 104009 | 0.053 | 30.304 | 104010 | 0.063 | 23.98 |
| 104011 | 0.043 | 30.068 | 104012 | 0.083 | 24.775 |
| 104013 | 0.032 | 58.997 | 104014 | 0.047 | 31.136 |
| 104015 | 0.087 | 43.955 | 104016 | 0.085 | 27.421 |
| 104017 | 0.039 | 23.184 | 104018 | 0.059 | 41.745 |
| 104019 | 0.015 | 47.808 | 204011 | 0.023 | 46.761 |
| 204012 | 0.082 | 45.388 | 204013 | 0.077 | 21.611 |
| 204015 | 0.041 | 25.887 | 204016 | 0.069 | 38.844 |
| 204017 | 0.079 | 39.767 | 204018 | 0.069 | 20.879 |
| 204019 | 0.163 | 36.133 | | | |

TABLE 7

Network Topology Optimization without Considering Sensitivities of Service Targets

| Network Device Maintained | Affected Service Targets | Switching Sequence | Load Shed | Total Impact (¥) |
|---|---|---|---|---|
| 110003 | 104002<br>104007<br>104009<br>104010<br>104011<br>104012<br>104015<br>104016<br>104018<br>104019 | close104011-210033<br>close104019-104007<br>open104012-104009<br>open110003-110002<br>open110003-110009<br>open110003-104009<br>open110003-104015 | 104009<br>104015 | 7000 |

In the network reconfiguration plan according to the proposed optimized network topology, the opening of switches 110003-110002, 110003-110009, 110003-104009 and 110003-104015 aims to isolate the node 110003. The closing of switches 104011-210033 and 104019-104007 restores the service targets affected by the isolation of maintained network device 110003. Due to the security constraint of power lines, service target 104009 is shed with the opening of switch 104012-104009. It can be seen that the service load of 104009 is the smallest one among all the affected service targets. Considering that the electricity unit loss for all service targets is the same without considering sensitivities, the optimization above has obtained an optimal result.

When the sensitivities of service targets to service outage is considered, e.g., when the $\rho_\alpha(X_i+d)$ is divided into three levels as shown in Equation (11), the results for network topology optimization and the corresponding reconfiguration plan is given in Table 8.

TABLE 8

Network Topology Optimization with Sensitivities of Service Targets Considered

| Network Device Maintained | Affected Service Targets | Switching Sequence | Load Shed | Total Impact (¥) |
|---|---|---|---|---|
| 110003 | 104002<br>104007<br>104009<br>104010<br>104011<br>104012<br>104015<br>104016<br>104018<br>104019 | close104011-210033<br>close104019-104007<br>open110007-104002<br>open110003-110002<br>open110003-110009<br>open110003-104009<br>open110003-104015 | 104002<br>104015 | 6030 |

Table 8 shows that after considering the sensitivities of service targets to service interruptions, the load shedding has been changed from 104009 to 104002. The sensitivity of load 104009 is 30.304, which is greater than 30 and consequently the corresponding unit service loss is ¥50,000/MWh according to Equation 11. The sensitivity value of load 104002 is 24.744, which is less than 30 and consequently, the corresponding unit service loss cost is ¥30,000/MWh. Although the service load amount of the service target 104002 is greater than that of the service target 104009, the topology optimization process correctly identifies that the total service impact in shedding 104002 is lower because of the sensitivity consideration.

Those of ordinary skill in the art understand that the implementations described above are for showing the workings of the principles disclosed in FIGS. 4-7 and are greatly simplified from actual service network scenarios. For example, the network topologies optimization example above only assumes maintenance of one network device, corresponding to a very simplified maintenance schedule. The combination of implementations above nevertheless show how these principles may be applied in a service network with complex topology and large number of network devices that need maintenance.

Once the optimized maintenance schedule is determined as described above, various maintenance resources may be allocated or assigned to the set of N maintenance tasks according to the maintenance schedule. These resources includes but are not limited to equipment, tools, and teams. As an example, the following implementations focus on assignment of the set of N maintenance tasks to the set of M maintenance teams. The goal of the assignment is to balance the worktime for all the maintenance teams. The balanced assignment is optimized under a set of constraints for assignment of maintenance tasks. The symbols and subscripts used in the equations below for maintenance task assignment are reset from the equations used in the maintenance schedule and topology optimization above. While those symbols and subscripts may be reused to refer to similar qualities to some extent, they should be generally viewed as a fresh set of mathematical representations.

In one implementation, the assignment of the M maintenance teams to the set of N maintenance tasks may be conveniently described by a binary N by M matrix $x_{jk}$ having M rows and N columns. Each row of the matrix represents maintenance task assignment for one maintenance team.

Each matrix element of $x_{jk}$, may be a binary number 0 or 1 that indicates whether a particular maintenance task is assigned to a particular team. Optimal maintenance task assignment aims at finding a globally optimal assignment matrix that minimizes a target function $f(x_{jk})$ for the assignment, which quantifies the worktime imbalance among maintenance teams and is a sum of square of difference of worktime among any two maintenance teams during the maintenance time period (e.g., 402 of FIG. 4) for the assignment, $f(x_{jk})$:

$$f(x_{jk})=\Sigma_{p=1,q=p+1}^{p=M,q=M-1}(X_p-X_q)^2 \quad (13)$$

where Xp and Xq represent numbers of work hours for maintenance teams p and q during the maintenance period of time, respectively. In other words, $X_p=\Sigma_{k=1}^{N}x_{pk}*t_k$, where $t_k$ denotes number of time slots needed for the kth maintenance task.

The set of assignment constraints may include but are not limited to:

$$(1) y_{gh} = \begin{cases} 1 & T_{h\,start} - T_{g\,end} < MinTimeGap \\ 0 & T_{h\,start} - T_{g\,end} \geq MinTimeGap \end{cases} \quad (14)$$

when $h > g$, $h \in (2, N)$, $g \in (1, N)$; and $$x_{jh} = F(y_{gh}) = \begin{cases} 0 \text{ or } 1; & h = 1 \\ 0; y_{gh} = 1 \text{ and } x_{jg} = 1, & h > g \geq 1, \text{ and} \\ 0 \text{ or } 1; & x_{jg} = 0 \end{cases}$$

$$(2) \sum_{j=1}^{M} x_{jk} = m_k, \quad (15)$$

where $y_{gh}$ is a N by N matrix that is referred to as the conflict matrix that exerts the first constraints on the assignment matrix and T represents the start or end time of a certain maintenance task according to the known and optimized maintenance schedule. The first constraint specifies that two tasks performed by the same maintenance team need to be MinTimeGap or more hours apart from the end of the earlier maintenance task and the start of the later one. Here MinTimeGap represent a predefined inter-task minimum time gap. This constraint guarantees that sufficient time is given to a maintenance team to move personnel and equipment from one network device to the next. The predefined MinTimeGap, for example, may be 4 hours. The second constraint specifies that the assignment must comply with the required number of maintenance teams needed to complete the kth maintenance task, $m_k$.

The maintenance task assignment optimization according to minimization of Equation 13 subject to the assignment constraints may be based on a discrete particle swarm optimization (DPSO) algorithms suitable for handling integer nonlinear problems. Specifically, each particle of a swarm of particles for the DPSO algorithm may have a position represented by be one N by M assignment matrix $x_{jk}$. There may be, for example, P particles. The position of a particle represents a single assignment solution of assignment matrix $x_{jk}$. The $f(x_{jk})$ of Equation (13) may be used as the fitting function for the DPSO algorithm. Each particle of solution is thus associated with a fitness value calculated according to Equation (13). The goal of DPSO is to find a globally optimal assignment matrix $x_{jk}$ that corresponds to a minimized fitness value. Each particle also corresponds to a velocity that determines the particle's position as it flies in the optimization parameter space through the DPSO iterations. As will be described in more detail below, the particles fly through the problem space by following the current optimum particles. PSO algorithm may be initialized with a group of random particles (solutions of $x_{jk}$) and then searches for optima by updating generations of solutions. In every iteration, each particle is updated by following two "best" values. The first one is the best solution (with the best fitness) the particular particle has achieved so far. This solution is referred to as xbest (corresponding to fitness value of fxbest) for each particle. Another "best" solution that is tracked is the best solution obtained so far by any particle in the swarm. This best solution is a global best among xbest of all particles and is referred to as gbest, corresponding to a fitness value of fgbest.

After finding the two best solutions, each particle updates its velocity and positions with following equations $$v_i = w*v_{i-1} + c_1*\text{rand}(\ )*(xbest-xcurrent_i) + c_2*\text{Rand}(\ )*(gbest-xcurrent_1) \quad (16)$$

$$xcurrent_{i+1} = xcurrent_1 + v_i \quad (17)$$

where rand( ) and Rand( ) are two random numbers between 0 and 1, $c_1$ and $c_2$ are learning factors ($c_1=c_2=1.4962$, for example), w is the inertia factor (between 0.8 and 1.2, for example. For another example, w=length(fxbest)*min (fxbest)/sum(fxbest)), and xcurrent represents the position of each particle after each DPSO iteration. The DPSO iteration index is represented by i. The best solutions xbest and gbest are updated after each iteration.

Figure 9:
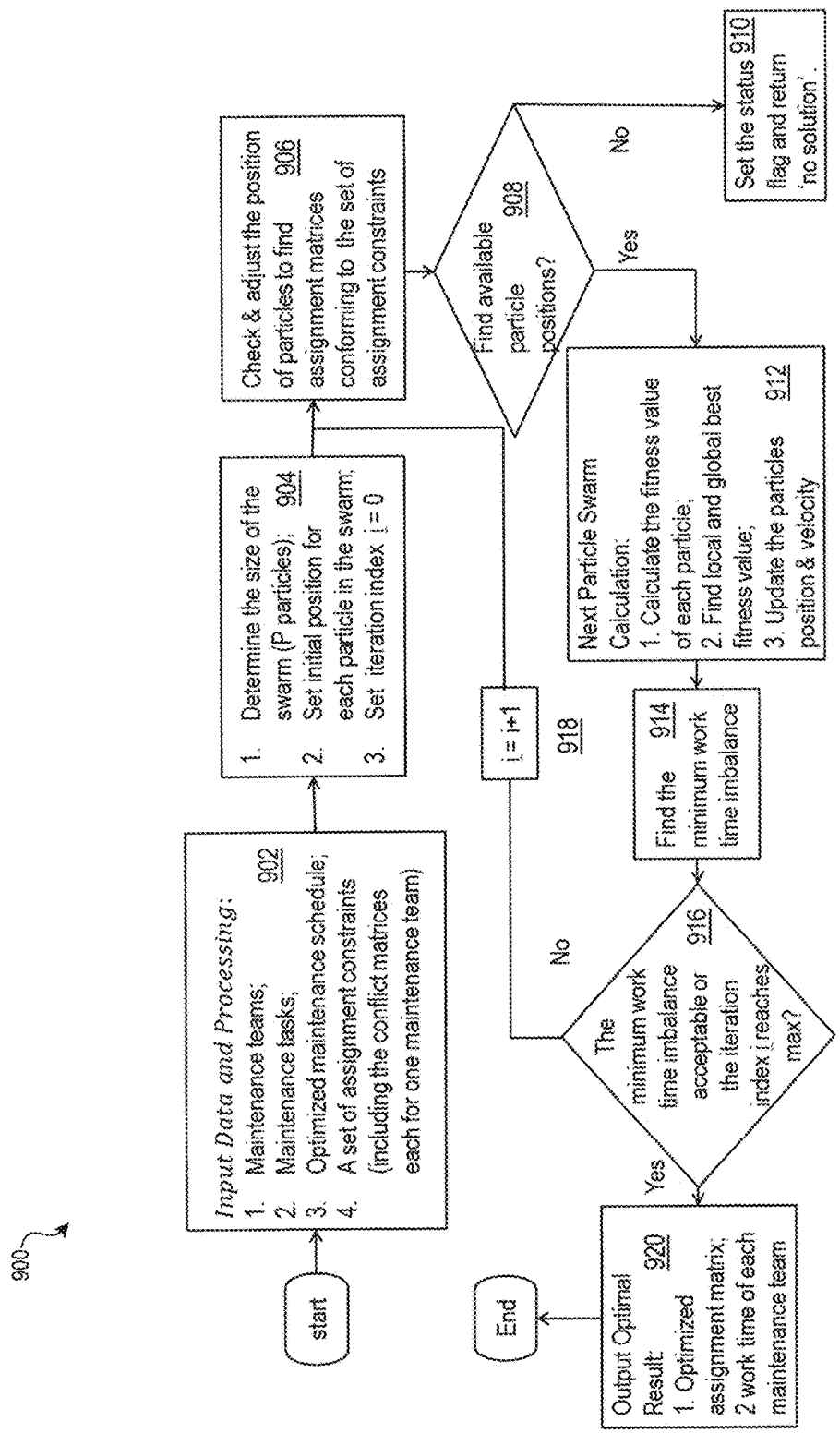
FIGS. 9 and 10 are flow diagrams of logic that the system may implement for workload balancing among maintenance teams based on a discrete particle swarm optimization algorithm.

FIG. 9 is a flow diagram of logic 900 that the system may implement for workload balancing among maintenance teams based on the DPSO algorithm described above. In block 902, various data may be input into the DPSO algorithm. These data include but are not limited to information about the set of M maintenance teams, information about the set of N maintenance tasks, the optimized maintenance schedule, and the set of assignment constraints described above.

In block 904, the size of the swarm, P, may be determined. The initial position of each particle in the swarm may be set, i.e., P initial assignment matrices $x_{jk}$ may be set. The initial assignment matrices may be set, for example, randomly. Further in block 904, the DPSO iteration index i is set to 0. In block 906, the constraints are applied to the particles. In particularly, the matrix element of the particles (the assignment matrices) may be adjusted such that the constraints such as Equations 14 and 15 are met. In block 908, the DPSO algorithm determines whether particles that satisfy the constraints can be found. If not, the DPSO algorithm flags that no solution is found in block 910. Otherwise, the DPSO algorithm proceeds to block 912 to update the particles based on Equations 16 and 17.

In block 914, the minimum worktime imbalance is determined. This value may be the global best fitness value fgbest. If it reaches a predetermined acceptable worktime imbalance or the iteration index i has reached a predetermined maximum number of iterations, the DPSO algorithm ends and the global best particle (or the optimal assignment matrix) is obtained in block 920. Otherwise, the DPSO algorithm advances the iteration index i in block 918 and proceeds to the next iteration in the loop formed by block 906, 908, 912, 914, 916 and 918.

Figure 10:
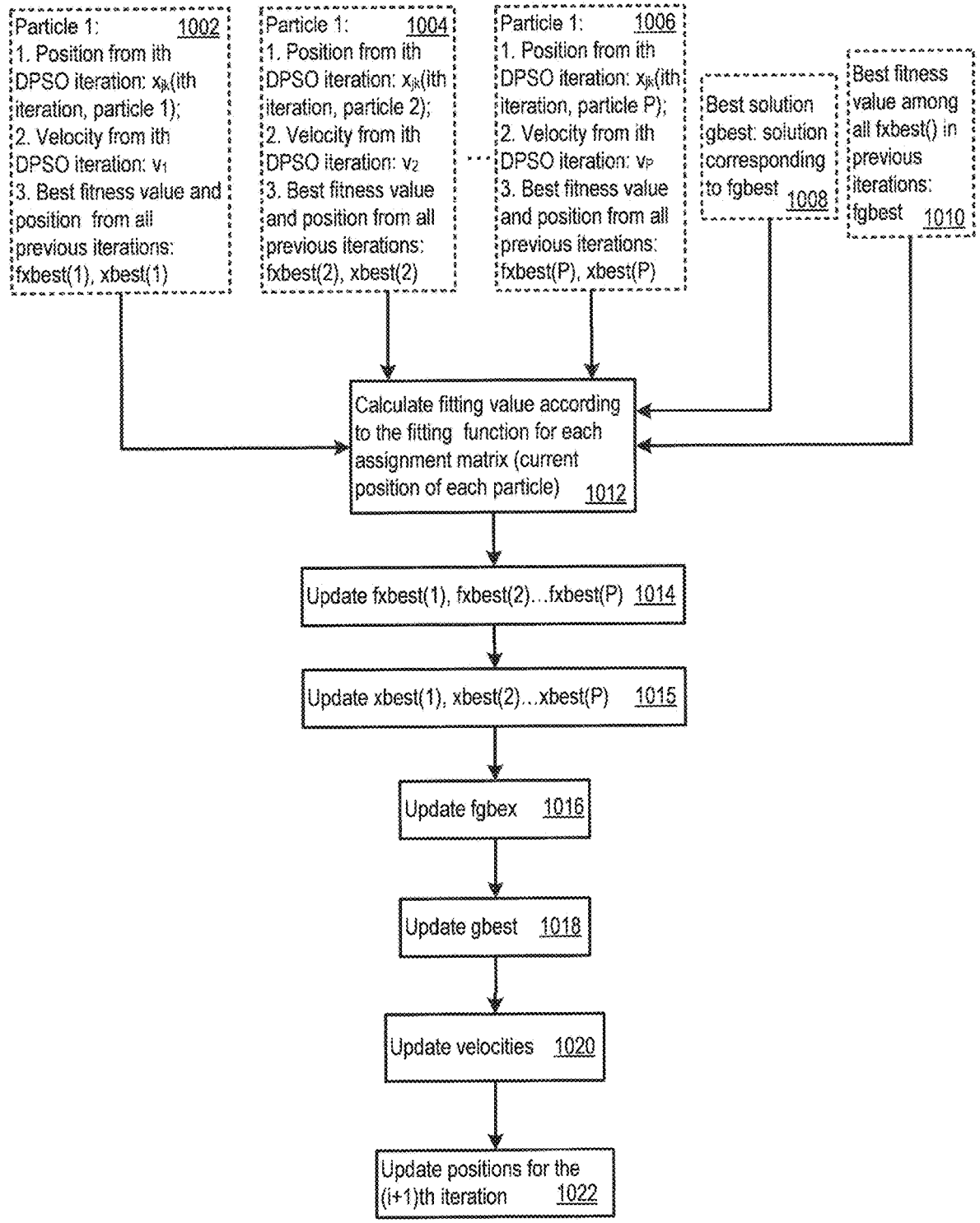

FIG. 10 shows more detail for block 912 in updating and flying the particles. Specifically, the position, velocity, best fitness value and solution for each particle are tracked, as shown in block 1002, 1004, and 1006. In addition, global best fitness value and global best solution are also tracked, as shown by block 1008 and 1010. In block 1012, fitness value for each particle in the current iteration is calculated based on Equations 13. In block 1014, the newly calculated fitness value for each particle may be compared to the previous best fitness value of the same particle. If the newly calculated fitness value for the particle is smaller than the previously tracked best fitness value for the particle, the tracked best fitness value for the particle is updated with the newly calculated fitness value. The best solution for the particle may correspondingly be updated in block 1015. In block 1016 and 1018, the global best fitness value and solution are updated if any of the newly calculated fitness values for all the particles is smaller than the previously tracked global best fitness value. In block 1020, the velocities of the particles are updated based on Equation 16. In block 1022, the positions of the particles (i.e., the assignment matrices for the particles) are updated based on Equation 17. The matrix elements of the assignment matrix for each particle may be maintained as binary number using various discretization algorithms. For example, binarization of the assignment matrix (particle) may be achieved by applying a discretization function when updating the position of the particle as shown in Equation 18 below:

$$x_{jk} = \begin{cases} 0, & Sig(v_{jk}) > xcurrent_{jk} \\ 1, & Sig(v_{jk}) \leq xcurrent_{jk} \end{cases}, \quad (18)$$

$$Sig(v_{jk}) = 1/(1 + \exp(-v_{jk}))$$

where $v_{jk}$ and $xcurrent_{jk}$ represent the matrix elements of the velocities and positions for each particle. The $x_{jk}$ represent the new discrete positions of each particle.

Figure 11:
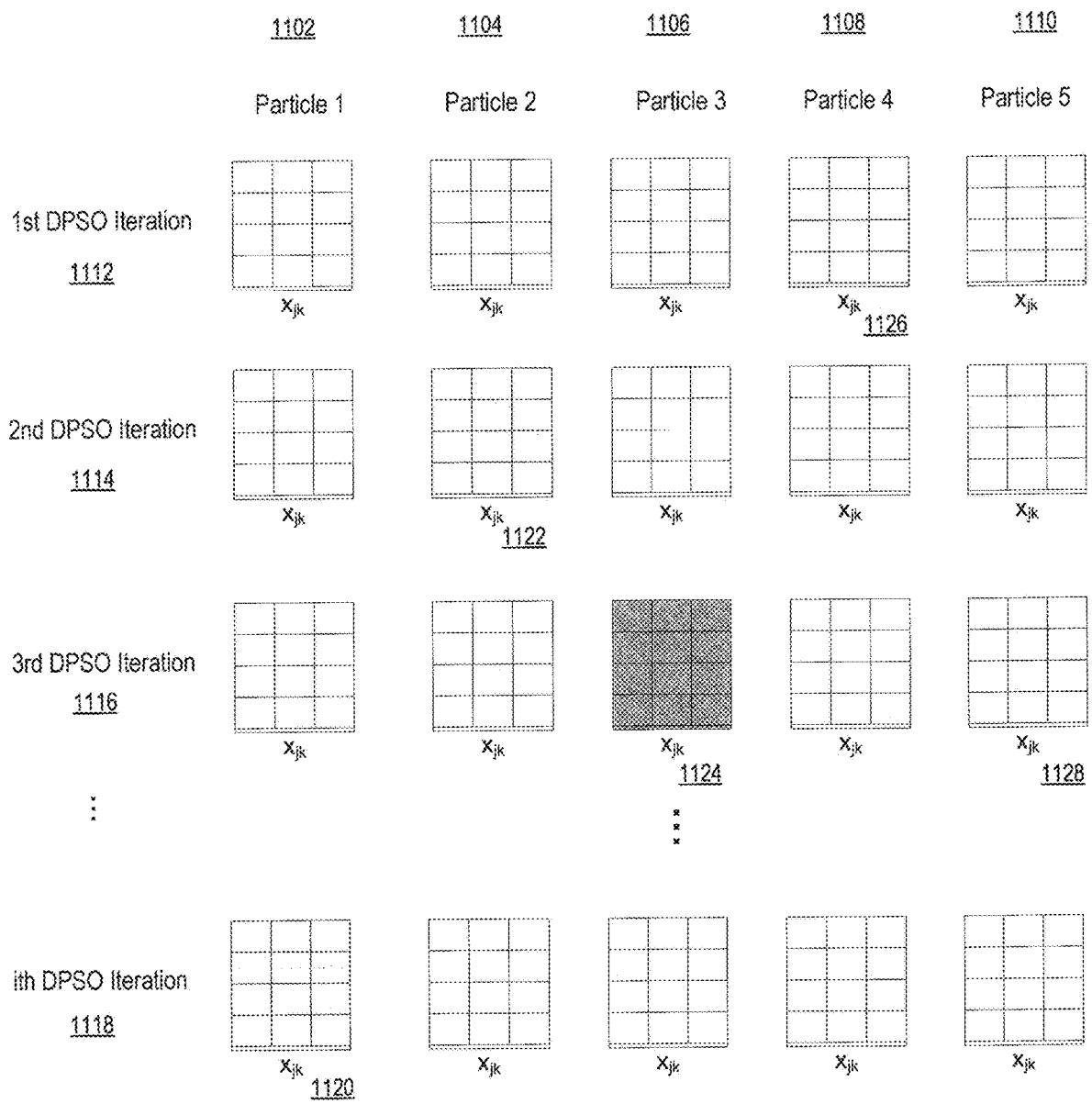
FIG. 11 shows the flow of particles in a discrete particle swarm optimization algorithm applied for assigning maintenance teams to maintenance tasks.

The flow of solutions in the DPSO implementation described above is further illustrated in FIG. 11. Each column, 1102, 1104, 1106, 1108, or 1110 represents the evolution of the assignment matrix for each particle. The rows 1112, 1114, 1116, and 1118 represent the DPSO iterations. In FIG. 11, four iterations have been completed. The shaded assignment matrices as solutions in the evolution, shown by 1120, 1122, 1124, 1126, and 1128 each represents the solution with smallest fitness values for each particle so far. The solution with dark shading, 1124 represents the assignment matrix withe global best fitness value so far. If the DPSO process wound end after these four iterations, then the optimal assignment matrix would be determined to be 1124.

In one implementation, a base method is disclosed. The method include obtaining from a maintenance task database a set of N maintenance tasks to be performed on network devices of a service network, where each network device is associated with providing service to at least one service target of a set of service targets of the service network and each maintenance task spans a task duration measured in terms of a predefined time unit. The method further includes determining allowable maintenance windows during a predefined operational time period of the service network and dividing the allowable maintenance windows into a maintenance time sequence of the predefined time unit. The method further includes creating a maintenance schedule for the set of N maintenance tasks on the maintenance time sequence. The method additionally includes creating a sequence of network topologies that capture network configurations over time and correspond to the maintenance time sequence, where each network topology is determined by on-off states of a set of configurable switches of the service network during the corresponding predefined time unit in the maintenance time sequence. The method also includes obtaining historical service load data for the set of service targets and obtaining constraints for the maintenance schedule and constraints for the sequence of network topologies. The method further includes iteratively optimizing the maintenance schedule by fixing the sequence of network topologies and minimizing a first maintenance-induced impact on the set of service targets while satisfying the constraints for maintenance schedule, and iteratively optimizing the sequence of network topologies by fixing the maintenance schedule and minimizing a second maintenance-induced impact on the set of service targets while satisfying the constraints for network topology. In addition, the method include after determining that the optimization of the sequence of network topologies has generated a modification to the sequence of network topologies, repeating, for less than a predefined number of iterations, the iterative optimizing of the maintenance schedule and the iterative optimizing of the sequence of network topologies. The method finally includes storing the optimized maintenance schedule in the maintenance task database and the optimized sequence of network topologies in a service network topology database, and configuring the set of configurable switches during the maintenance time sequence according to the optimized sequence of network topologies. Here, the sensitivity to service outage for each network device may include a weighted combination of a time dependent load level, an importance level, a time-dependent historical complaint equivalent value for service outage, and a time dependent index quantifying request for uninterrupted service for each network device.

Optionally in the base method implementation above, the time-dependent load level for each network device may include a weighted linear combination of a service load capacity of each network device normalized to a total service load capacity of the service network and an forecasted time-dependent service load for each network device normalized between a forecasted next-month maximum and a minimum service load of each network device according to the historical service load data.

Optionally in base method implementation above, the importance level for each network device may include an average importance of all service targets associated with and whose service is provided by the network device.

As another option in the base method implementation above, the time-dependent historical complaint equivalent value for service outage for each network device is proportional to a number of historical customer complaints received from all service targets associated with and whose service is provided by the network device during similar time.

As yet another option in the base method implementation above, the time dependent index quantifying request for uninterrupted service for each network device comprises a value chosen from at least two predefined values depending on whether each network device is connected to at least one service target requesting uninterrupted service.

In another implementation, a base system is disclosed. The system includes a communication interface, a memory, and a circuitry in communication with the memory and the communication interface. The memory includes a sequence of network topologies for a service network that capture network configuration of the service network and that correspond to a maintenance time sequence of a predefined time unit determined from dividing allowable maintenance windows for network devices of the service network during a predefined operational time period of the service network, where each network device is associated with providing service to at least one service target of a set of service targets of the service network and where each network topology of the sequence of network topologies is determined by on-off states of a set of configurable switches of the service network during the corresponding predefined time unit in the maintenance time sequence. The memory also includes a maintenance schedule for a set of N maintenance tasks obtained from a maintenance task database for the network devices of the service network on the maintenance time sequence, where each maintenance task spans a task duration measured in terms of the predefined time unit. The memory further includes historical service load data for the set of service targets, constraints for the maintenance schedule, constraints for the sequence of network topologies, and circuitry in communication with the memory and the communication interface. The circuitry of the system is configured to iteratively optimize the maintenance schedule by fixing the sequence of network topologies and minimizing a first maintenance-induced impact on the set of service targets while satisfying the constraints for maintenance schedule. The circuitry of the system is also configured to iteratively optimize the sequence of network topologies by fixing the maintenance schedule and minimizing a second maintenance-induced impact on the set of service targets while satisfying the constraints for network topology. After determining that to optimize the sequence of network topologies has generated a modification to the sequence of network topologies, the circuitry of the system is further configured to iterate, for less than a predefined number of iterations, the optimize step for the maintenance schedule and the optimize step for the sequence of network topologies. Finally, the circuitry is configured to store the optimized maintenance schedule in the maintenance task database and the optimized sequence of network topologies in a service network topology database, and configure, via the communication interface, the set of configurable switches during the maintenance time sequence according to the optimized sequence of network topologies. Here, the time-dependent load level for each network device comprises a weighted linear combination of a service load capacity of each network device normalized to a total service load capacity of the service network and a forecasted time-dependent service load for each network device normalized between a forecasted next-month maximum and a minimum service load of each network device according to the historical service load data.

In the base system above, the service network may optionally be an electric grid or portion of an electric grid and the network devices may optionally include at least two electric service injection nodes for receiving electricity injections from electricity sources.

Optionally in the base system above, the importance level for each network device may include an average importance of all service targets associated with and whose service is provided by the network device.

As another option in the base system above, the time-dependent historical complaint equivalent value for service outage for each network device may be proportional to a number of historical customer complaints received from all service targets associated with and whose service is provided by the network device during similar time.

As another option in the base system above, the time dependent index quantifying request for uninterrupted service for each network device may include a value chosen from at least two predefined values depending on whether each network device is connected to at least one service target requesting uninterrupted service.

As yet another option in the base system above, constraints for scheduling include at least a restriction that the set of N maintenance tasks do not overlap in time.

In another system, the circuitry of the base system above may be further configured to identify M maintenance teams available for assignment to the set of N maintenance tasks according to the optimized maintenance schedule during the maintenance time sequence, where each of the set of N maintenance tasks requires a predefined number of maintenance teams to complete, construct multiple different N×M assignment matrices of binary matrix elements in conformance with a set of assignment constraints, each binary matrix element indicating whether a corresponding maintenance task of the set of N maintenance tasks is assigned to a corresponding maintenance team of the M maintenance teams, evolve each assignment matrix of the multiple assignment matrices under the set of assignment constraints to determine an assignment matrix with best work time balance among the M maintenance teams using a discrete particle swarm optimization (DPSO) algorithm with a fitting function being a sum of square of work time difference between any two maintenance teams of the M maintenance teams, and assign the M maintenance teams to the set of N maintenance tasks according to the assignment matrix with the best work time balance. Here, the set of assignment constraints comprises a restriction that time span between two maintenance tasks assigned to a same maintenance team of the M maintenance teams equals to or is longer than a predefined inter-task minimum time gap.

In the other system above, matrix elements associated with each maintenance team in the multiple assignment matrices may be a particle in the DPSO algorithm.

Returning to FIG. 2, in a networked deployment, the computing and control subsystem 201 may operate in the capacity of a server or as a client user computer in a server-client user network environment, or as a peer computer system in a peer-to-peer (or distributed) network environment. The computing and control subsystem 201 may also be implemented as, or incorporated into, various devices, such as a personal computer ("PC"), a tablet PC, a set-top box ("STB"), a personal digital assistant ("PDA"), a mobile device such as a smart phone or tablet, a palmtop computer, a laptop computer, a desktop computer, a network router, switch or bridge, or any other machine capable of executing a set of instructions (sequential or otherwise) that specify actions to be taken by that machine. Further, while a single computing and control subsystem 201 is illustrated, the term "subsystem" shall also be taken to include any collection of systems or sub-systems that individually or jointly execute a set, or multiple sets, of instructions to perform one or more computer functions. The system circuitry of the computing and control subsystem 201 may be alternatively implemented as a virtual computing machine.

The methods, devices, processing, frameworks, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and controlled, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

The principles described herein may be embodied in many different forms. Not all of the depicted components may be required, however, and some implementations may include additional components. Variations in the arrangement and type of the components may be made without departing from the spirit or scope of the claims as set forth herein. Additional, different or fewer components may be provided.

While some mathematical symbols (including subscripts and superscripts) are used globally above to represent certain physical or conceptual qualities, other mathematical symbols may be used consistently refer to same qualities only within a logic section of description. Thus, those of ordinary skill in the art understand that some symbols may be recycled in different logic sections to represent different quantities.

Reference throughout this specification to "one example," "an example," "examples," "one embodiment," "an embodiment," "example embodiment," or the like in the singular or plural means that one or more particular features, structures, or characteristics described in connection with an embodiment or an example is included in at least one embodiment or one example of the present disclosure. Thus, the appearances of the phrases "in one embodiment," "in an embodiment," "in an example embodiment," "in one example," "in an example," or the like in the singular or plural in various places throughout this specification are not necessarily all referring to the same embodiment or a single embodiment. Furthermore, the particular features, structures, or characteristics may be combined in any suitable manner in one or more embodiments or examples.

The terminology used in the description herein is for the purpose of describing particular examples only and is not intended to be limiting. As used herein, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

It should be noticed that, the steps illustrated in the flowchart of the drawings may be performed in a set of computer devices using executable program code. And the order of the steps may be different from that in the drawings under some status, although an example logic order is shown in the flowchart.

Various implementations have been specifically described. However, many other implementations are also possible.

What is claimed is:

1. A method comprising:
obtaining from a maintenance task database a set of N maintenance tasks to be performed on network devices of a service network, where each network device is associated with providing service to at least one service target of a set of service targets of the service network and each maintenance task spans a task duration measured in terms of a predefined time unit;
determining allowable maintenance windows during a predefined operational time period of the service network and dividing the allowable maintenance windows into a maintenance time sequence of the predefined time unit;
creating a maintenance schedule for the set of N maintenance tasks on the maintenance time sequence;
creating a sequence of network topologies that capture network configurations over time and correspond to the maintenance time sequence, where each network topology is determined by on-off states of a set of configurable switches of the service network during the corresponding predefined time unit in the maintenance time sequence;
obtaining constraints for the maintenance schedule and constraints for the sequence of network topologies;
iteratively optimizing the maintenance schedule by fixing the sequence of network topologies and minimizing a first maintenance-induced impact on the set of service targets while satisfying the constraints for maintenance schedule;
iteratively optimizing the sequence of network topologies by fixing the maintenance schedule and minimizing a second maintenance-induced impact on the set of service targets while satisfying the constraints for network topology;

after determining that the optimization of the sequence of network topologies has generated a modification to the sequence of network topologies, repeating, for less than a predefined number of iterations, the iterative optimizing of the maintenance schedule and the iterative optimizing of the sequence of network topologies;

storing the optimized maintenance schedule in the maintenance task database and the optimized sequence of network topologies in a service network topology database; and configuring the set of configurable switches during the maintenance time sequence according to the optimized sequence of network topologies.

2. The method of claim 1, where the service network comprises a portion of an electric grid.

3. The method of claim 2, where the network devices further comprises at least two electric service injection nodes for receiving electricity injections from electricity sources.

4. The method of claim 2, where the network devices comprise distribution transformers.

5. The method of claim 4, where the constraints for the sequence of topologies further comprises:
a restriction that each distribution transformer is only energized by one injection node; and
a restriction that a network device of the network devices is isolated by reconfiguring the set of configurable switches during maintenance of the network device.

6. The method of claim 1, where the second maintenance-induced impact on the set of service targets comprises a weighted sum of the first maintenance induced impact and a total number of switching actions of the set of configurable switches for implementing the sequence of network topologies.

7. The method of claim 1, where the first maintenance-induced impact on the set of service targets comprises an estimated lost amount of service due to maintenance multiplied by an adjusted unit service value for each network device integrated over the maintenance time sequence and the sequence of network topologies, where the lost amount of service for each network device is estimated according to forecasted service load data and where the adjusted unit service value for each network device comprises a unit service price adjusted by a sensitivity to service outage for each network device.

8. The method of claim 7, where the sensitivity to service outage for each network device comprises a weighted combination of a time dependent load level, an importance level, a time-dependent historical complaint equivalent value for service outage, and a time dependent index quantifying request for uninterrupted service for each network device.

9. The method of claim 1, where the constraints for scheduling comprise at least a restriction that the set of N maintenance tasks do not overlap in time.

10. The method of claim 1, further comprising:
identifying M maintenance teams available for assignment to the set of N maintenance tasks according to the optimized maintenance schedule during the maintenance time sequence, where each of the set of N maintenance tasks requires a predefined number of maintenance teams to complete;
constructing multiple different N×M assignment matrices of binary matrix elements in conformance with a set of assignment constraints, each binary matrix element indicating whether a corresponding maintenance task of the set of N maintenance tasks is assigned to a corresponding maintenance team of the M maintenance teams;
evolving each assignment matrix of the multiple assignment matrices under the set of assignment constraints to determine an assignment matrix with best work time balance among the M maintenance teams using a discrete particle swarm optimization (DPSO) algorithm with a fitting function being a sum of square of work time difference between any two maintenance teams of the M maintenance teams; and
assigning the M maintenance teams to the set of N maintenance tasks according to the assignment matrix with the best work time balance.

11. The method of claim 10, where the set of assignment constraints comprises a restriction that time span between two maintenance tasks assigned to a same maintenance team of the M maintenance teams equals to or is longer than a predefined inter-task minimum time gap.

12. The method of claim 10, where matrix elements associated with each maintenance team in the multiple assignment matrices is a particle in the DPSO algorithm.

13. A system, comprising:
a communication interface;
a memory comprising:
a sequence of network topologies for a service network that capture network configuration of the service network and that correspond to a maintenance time sequence of a predefined time unit determined from dividing allowable maintenance windows for network devices of the service network during a predefined operational time period of the service network, where each network device is associated with providing service to at least one service target of a set of service targets of the service network and where each network topology of the sequence of network topologies is determined by on-off states of a set of configurable switches of the service network during the corresponding predefined time unit in the maintenance time sequence;
a maintenance schedule for a set of N maintenance tasks obtained from a maintenance task database for the network devices of the service network on the maintenance time sequence, where each maintenance task spans a task duration measured in terms of the predefined time unit;
constraints for the maintenance schedule; and
constraints for the sequence of network topologies; and
circuitry in communication with the memory and the communication interface, the circuitry configured to:
iteratively optimize the maintenance schedule by fixing the sequence of network topologies and minimizing a first maintenance-induced impact on the set of service targets while satisfying the constraints for maintenance schedule;
iteratively optimize the sequence of network topologies by fixing the maintenance schedule and minimizing a second maintenance-induced impact on the set of service targets while satisfying the constraints for network topology;
after determining that to optimize the sequence of network topologies has generated a modification to the sequence of network topologies, iterate, for less than a predefined number of iterations, the optimize step for the maintenance schedule and the optimize step for the sequence of network topologies;

store the optimized maintenance schedule in the maintenance task database and the optimized sequence of network topologies in a service network topology database; and configure, via the communication interface, the set of configurable switches during the maintenance time sequence according to the optimized sequence of network topologies.

14. The system of claim 13, where the service network comprises a portion of an electric grid.

15. The system of claim 14, where the network devices comprises distribution transformers.

16. The system of claim 15, where the constraints for the sequence of topologies further comprises:
a restriction that each distribution transformer is only energized by one injection node; and
a restriction that a network device of the network devices is isolated by reconfiguring the switches during maintenance of the network device.

17. The system of claim 13, where the second maintenance-induced impact on the set of service targets comprises a weighted sum of the first maintenance induced impact and a total number of switching actions of the set of configurable switches for implementing the sequence of network topologies.

18. The system of claim 13, where the first maintenance-induced impact on the set of service targets comprises an estimated lost amount of service due to maintenance multiplied by an adjusted unit service value for each network device integrated over the maintenance time sequence and the sequence of network topologies, where the lost amount of service for each network device is estimated according to forecasted service load data and where the adjusted unit service value for each network device comprises a unit service price adjusted by a sensitivity to service outage for each network device.

19. The system of claim 13, where the sensitivity to service outage for each network device is a weighted combination of a time dependent load level, an importance level, a time-dependent historical complaint equivalent value for service outage, and a time dependent index quantifying request for uninterrupted service for each network device.

20. The system of claim 13, where the circuitry is further configured to:
identify M maintenance teams available for assignment to the set of N maintenance tasks according to the optimized maintenance schedule during the maintenance time sequence, where each of the set of N maintenance tasks requires a predefined number of maintenance teams to complete;
construct multiple different N×M assignment matrices of binary matrix elements in conformance with a set of assignment constraints, each binary matrix element indicating whether a corresponding maintenance task of the set of N maintenance tasks is assigned to a corresponding maintenance team of the M maintenance teams;
evolve each assignment matrix of the multiple assignment matrices under the set of assignment constraints to determine an assignment matrix with best work time balance among the M maintenance teams using a discrete particle swarm optimization (DPSO) algorithm with a fitting function being a sum of square of work time difference between any two maintenance teams of the M maintenance teams; and
assign the M maintenance teams to the set of N maintenance tasks according to the assignment matrix with the best work time balance.

\* \* \* \* \*

UNITED STATES PATENT AND TRADEMARK OFFICE
CERTIFICATE OF CORRECTION

PATENT NO. : 10,979,294 B2  
APPLICATION NO. : 16/326849  
DATED : April 13, 2021  
INVENTOR(S) : Ming Li et al.

It is certified that error appears in the above-identified patent and that said Letters Patent is hereby corrected as shown below:

In the Specification

At Column 9, Line 44, please italicize "*j*th".

At Column 9, Line 45, please italicize "*k*th".

At Column 10, Lines 10, 26, 47, please italicize "*j*th".

At Column 10, Line 11, please italicize "*k*th".

At Column 10, Lines 16, 25, 35, 41, 46, please delete the character space between "j" and "th" and italicize the "*j*".

At Column 10, at the bottom of the column please replace the equation with the below equation:

" $C_{loss}^s = \sum_{j=1}^{L_m} \sum_{d=0}^{D_j-1} \sum_{a \in outLoad(X_j)} P_a(X_j + d) p_a(X_j + d)$ ".

At Column 11, Lines 9, 10, 12, please correct "ath" and replace with "αth".

At Column 12, Lines 35 and 61, delete the "(" and replace with "¥".

Signed and Sealed this  
Fifteenth Day of June, 2021

Drew Hirshfeld  
*Performing the Functions and Duties of the*  
*Under Secretary of Commerce for Intellectual Property and*  
*Director of the United States Patent and Trademark Office*